(12) United States Patent
Burgess

(10) Patent No.: US 11,486,334 B2
(45) Date of Patent: Nov. 1, 2022

(54) LOCKING ACTUATORS FOR THRUST REVERSER ACTUATION SYSTEMS, ENGINES AND AIRCRAFT INCLUDING THE SAME, AND ASSOCIATED METHODS

(71) Applicant: The Boeing Company, Chicago, IL (US)

(72) Inventor: Michael John Burgess, Seattle, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 16/888,100

(22) Filed: May 29, 2020

(65) Prior Publication Data

US 2021/0372348 A1 Dec. 2, 2021

(51) Int. Cl.
*F02K 1/76* (2006.01)
*F02K 1/72* (2006.01)

(52) U.S. Cl.
CPC .............. *F02K 1/766* (2013.01); *F02K 1/72* (2013.01); *F02K 1/763* (2013.01); *F05D 2220/323* (2013.01); *F05D 2270/3015* (2013.01); *F05D 2270/64* (2013.01)

(58) Field of Classification Search
CPC . F02K 1/766; F02K 1/763; F02K 1/72; F05D 2270/64
See application file for complete search history.

(56) References Cited

U.S. PATENT DOCUMENTS

| | | | |
|---|---|---|---|
| 11,053,889 B2 * | 7/2021 | Kopecek | F02K 1/62 |
| 2007/0057119 A1 * | 3/2007 | McAuley | F15B 15/1466 |
| | | | 244/11 OB |
| 2014/0270935 A1 * | 9/2014 | Willett | F02K 1/766 |
| | | | 403/375 |
| 2016/0333824 A1 * | 11/2016 | Le Coq | F02K 1/763 |
| 2020/0271072 A1 * | 8/2020 | Kopecek | F02K 1/766 |

FOREIGN PATENT DOCUMENTS

EP 0801221 * 10/1997 ............... F02K 1/76

* cited by examiner

*Primary Examiner* — Andrew H Nguyen
(74) *Attorney, Agent, or Firm* — Dascenzo Gates Intellectual Property Law, P.C.

(57) ABSTRACT

Locking actuators for thrust reverser actuation systems, engines and aircraft including the same, and associated methods. A locking actuator includes an actuator housing, an extension element, and a lock assembly. The extension element is configured to translate along an actuator axis to transition between a retracted state and an extended state. The lock assembly transitions between a locked state and an unlocked state independent of transitioning the extension element between the retracted and extended states. In examples, a thrust reverser actuation system includes an actuator assembly with the locking actuator and a hydraulic control assembly. In examples, an engine includes a thrust generator, a nacelle, a transcowl, and the thrust reverser actuation system. In examples, a method of operating a thrust reverser actuation system includes transitioning a lock assembly from a locked state to an unlocked state and transitioning an extension element from a retracted state to an extended state.

20 Claims, 10 Drawing Sheets

LOCKING ACTUATORS FOR THRUST REVERSER ACTUATION SYSTEMS, ENGINES AND AIRCRAFT INCLUDING THE SAME, AND ASSOCIATED METHODS

FIELD

The present disclosure relates to locking actuators for thrust reverser actuation systems, engines and aircraft including the same, and associated methods.

BACKGROUND

Airbreathing jet engines such as turbofan engines accelerate an incoming airstream to generate a large amount of thrust, such as to propel an aircraft at high speeds. Upon landing such an aircraft, runway length limitations motivate a desire to reduce the speed of the aircraft as quickly as possible. Thus, engines often are equipped with thrust reverser mechanisms that enable the engine to selectively transition to a reverse thrust configuration in which the engine produces a reverse thrust from the incoming airstream to actively decelerate the aircraft. Such thrust reverser mechanisms typically include an actuator with a lock mechanism that prevents the actuator from inadvertently transitioning the engine to the reverse thrust configuration. In such examples, it is desirable that the actuator be able to provide an accurate and reliable indication of whether the lock mechanism is locked or unlocked. Such an indication often is provided by a lock status identifier that utilizes a non-contact proximity sensor to determine a relative position of a portion of the lock mechanism. Prior lock status identifiers utilize a sensor target that is coupled to the lock mechanism only indirectly, such as via a lever mechanism that amplifies a motion of the lock mechanism itself. By contrast, configuring a locking actuator such that the sensor target may be directly coupled to the lock mechanism may facilitate a more robust and reliable lock status indication scheme.

SUMMARY

Locking actuators for thrust reverser actuation systems, engines and aircraft including the same, and associated methods are disclosed herein. A locking actuator is configured to be utilized in conjunction with a thrust reverser actuation system of an engine that is configured to be selectively transitioned between a forward thrust configuration and a reverse thrust configuration. The locking actuator includes an actuator housing, an extension element positioned at least partially within the actuator housing, and a lock assembly with a lock member. The extension element is configured to be operatively coupled to a transcowl of the engine to transition the engine between the forward thrust configuration and the reverse thrust configuration. The extension element defines and extends along an actuator axis, and the extension element is configured to translate along the actuator axis to selectively transition the extension element between a retracted state corresponding to the forward thrust configuration and an extended state corresponding to the reverse thrust configuration. The lock assembly is configured to be selectively transitioned between a locked state, in which the lock member mechanically restricts the extension element from transitioning from the retracted state to the extended state, and an unlocked state, in which the extension element is free to transition from the retracted state to the extended state. The lock assembly is configured to be selectively transitioned between the locked state and the unlocked state independent of transitioning the extension element between the retracted state and the extended state.

In some examples, a thrust reverser actuation system is configured to selectively translate a transcowl of an engine between a forward thrust configuration and a reverse thrust configuration, and includes an actuator assembly with the locking actuator as well as a hydraulic control assembly. In such examples, the actuator assembly is operatively coupled to the transcowl and is configured to translate the transcowl along a direction parallel to the actuator axis. The hydraulic control assembly is configured to regulate a flow of hydraulic fluid to the actuator assembly via one or more hydraulic conduits to selectively transition the transcowl between the forward thrust configuration and the reverse thrust configuration.

In some examples, an engine includes a thrust generator that receives an incoming airstream, a nacelle at least substantially enclosing the thrust generator, a transcowl operatively coupled to the nacelle, and the thrust reverser actuation system. In such examples, the thrust reverser actuation system is configured to selectively translate the transcowl relative to the nacelle to selectively transition the engine between the forward thrust configuration and the reverse thrust configuration. When the engine is in the forward thrust configuration, the thrust generator generates a thrust airstream in a forward thrust direction. When the engine is in the reverse thrust configuration, the thrust generator generates a reverse thrust airstream at least partially in a reverse thrust direction that is opposite the forward thrust direction. Aircraft including such engines also are disclosed herein.

In some examples, a method of operating a thrust reverser actuation system includes selectively transitioning a transcowl of an engine from a forward thrust configuration to a reverse thrust configuration by transitioning a lock assembly of a locking actuator from a locked state to an unlocked state and subsequently and independently transitioning an extension element of the locking actuator from a retracted state to an extended state.

DESCRIPTION

Figure 1:
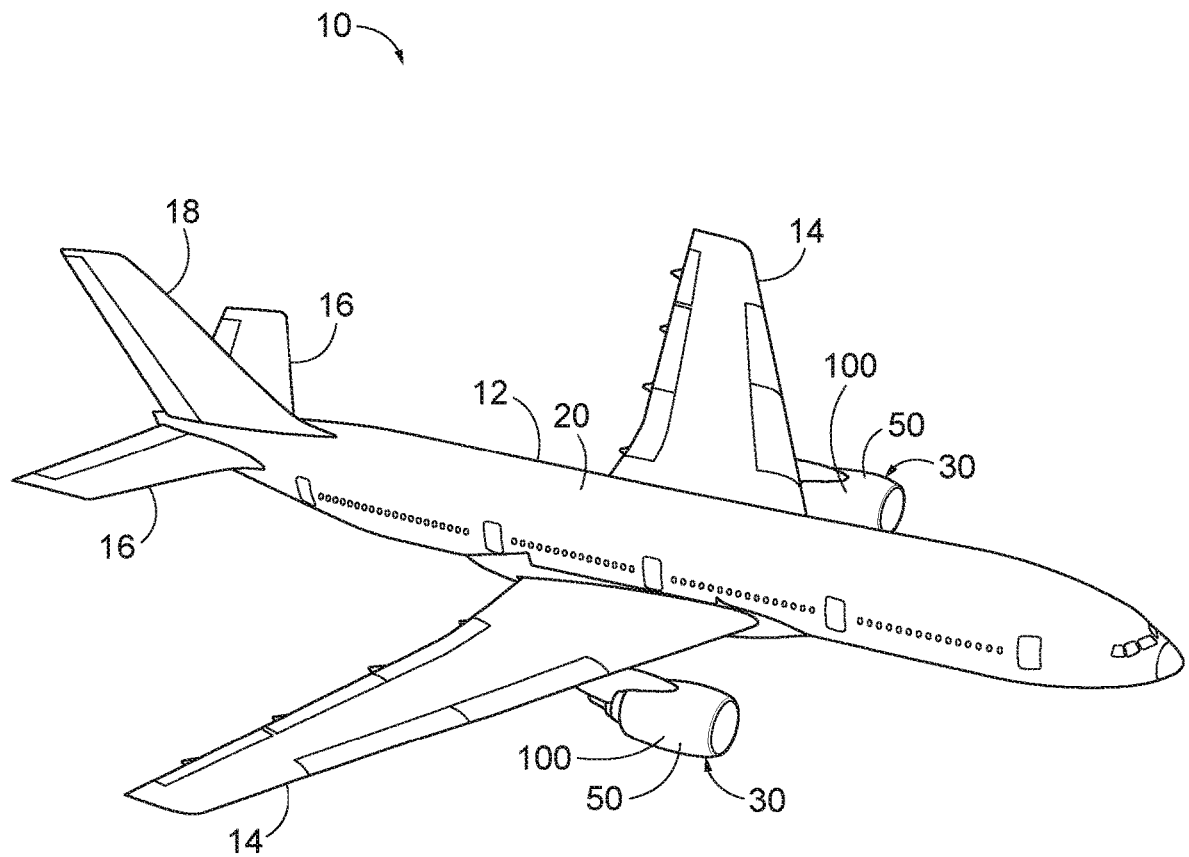
FIG. 1 is a representation of an example of an aircraft that includes engines, thrust reverser actuation systems, and/or locking actuators according to the present disclosure

FIGS. 1-11 provide illustrative, non-exclusive examples of locking actuators 100, of thrust reverser actuation systems 50 including locking actuators 100, of engines 30 including thrust reverser actuation systems 50 and/or locking actuators 100, and/or of aircraft 10 including engines 30, thrust reverser actuation systems 50, and/or locking actuators 100, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is a representation of an aircraft 10, such as may include thrust reverser actuation systems 50 and/or locking actuators 100 according to the present disclosure. In some examples, and as shown in FIG. 1, aircraft 10 includes a fuselage 12, one or more wings 14, a horizontal stabilizer 16, and/or a vertical stabilizer 18. In some examples, and as shown in FIG. 1, aircraft 10 includes an aircraft hydraulic system 20, as described herein. Aircraft 10 further includes one or more engines 30 for providing a thrust force to propel aircraft 10.

Figure 2:
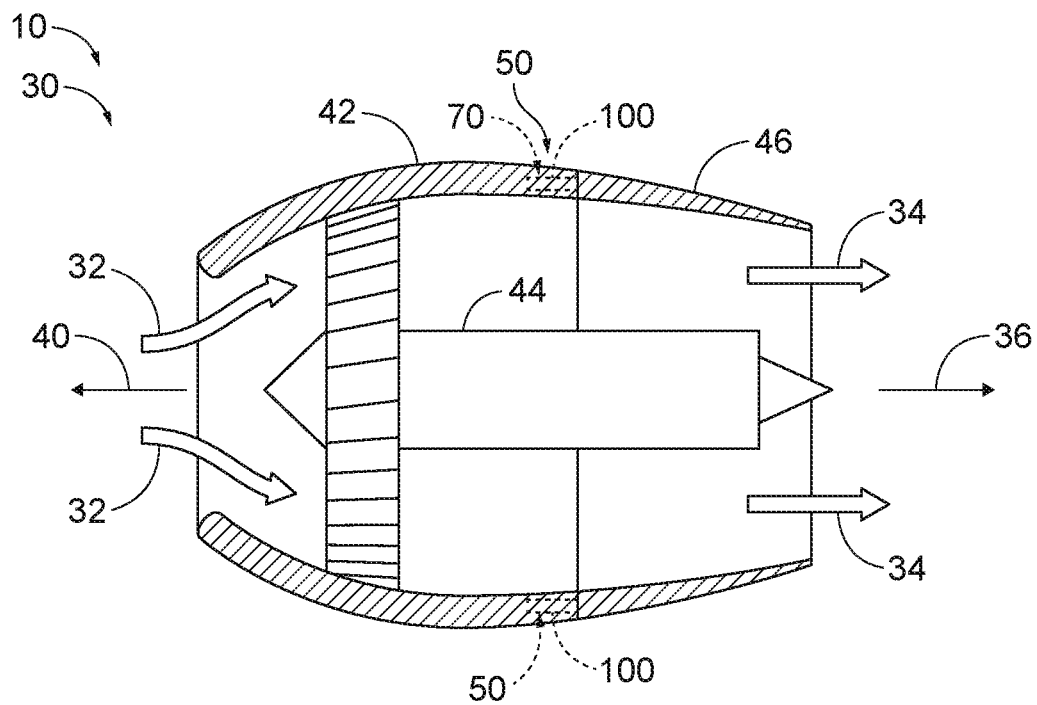
FIG. 2 is a schematic cross-sectional side elevation view illustrating examples of an engine in a forward thrust configuration according to the present disclosure.
Figure 3:
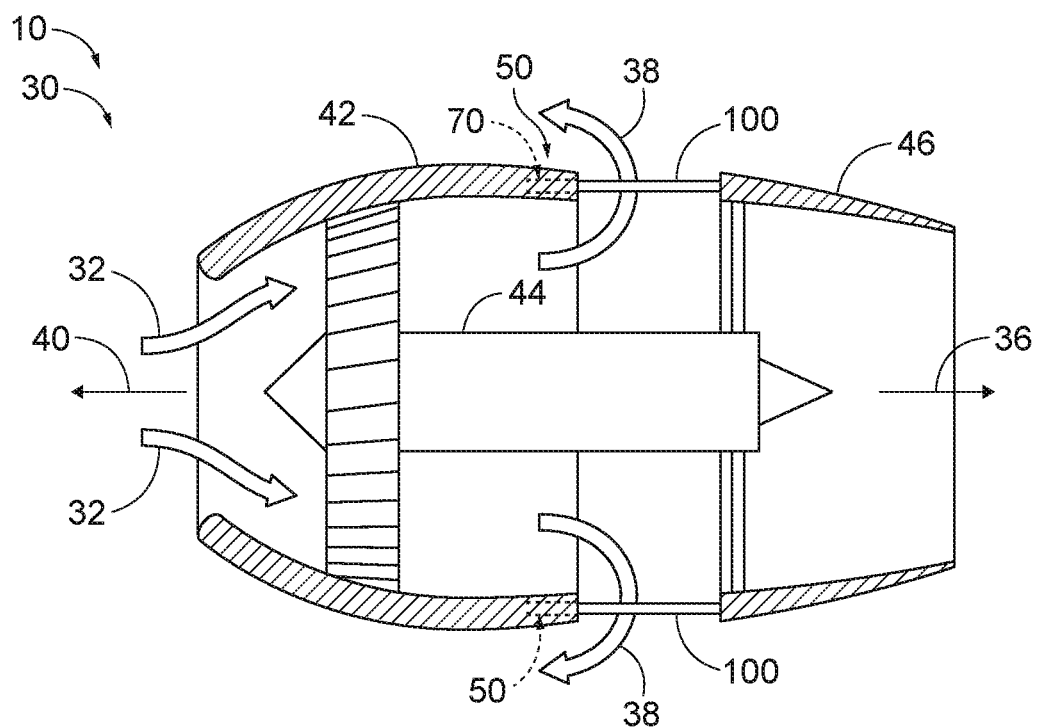
FIG. 3 is a schematic cross-sectional side elevation view illustrating examples of an engine in a reverse thrust configuration according to the present disclosure.

FIGS. 2-3 are schematic cross-sectional side views of an example of engine 30, such as engine 30 of aircraft 10. As schematically illustrated in FIGS. 2-3, engine 30 includes a thrust generator 44, a nacelle 42 at least substantially enclosing thrust generator 44, and a transcowl 46 operatively coupled to nacelle 42. Engine 30 further includes a thrust reverser actuation system 50 configured to selectively translate transcowl 46 relative to nacelle 42 to selectively transition engine 30 between a forward thrust configuration, shown in FIG. 2, and a reverse thrust configuration, shown in FIG. 3. Specifically, and as schematically illustrated in FIGS. 2-3, thrust reverser actuation system 50 includes an actuator assembly 70 with at least one locking actuator 100 that selectively translates transcowl 46 relative to nacelle 42. As used herein, transcowl 46 also may be referred to as a translating cowl 46. As used herein, the term "forward thrust configuration" may refer to a configuration of engine 30 and/or may refer to a configuration of transcowl 46 that corresponds to, and/or results in, the forward thrust configuration of engine 30. Similarly, as used herein, the term "reverse thrust configuration" may refer to a configuration of engine 30 and/or may refer to a configuration of transcowl 46 that corresponds to, and/or results in, the reverse thrust configuration of engine 30.

In some examples, engine 30 is a turbofan engine. However, this is not required, and it is within the scope of the present disclosure that engine 30 may be any appropriate engine that includes thrust reverser actuation systems 50 and/or locking actuators 100 as disclosed herein, such as a turbojet engine. Additionally, while the present disclosure generally relates to thrust reverser actuation systems 50 that translate transcowl 46 along an axis, such as a cascade thrust reverser, it is additionally within the scope of the present disclosure that locking actuator 100 and/or aspects thereof may be utilized in conjunction with any appropriate thrust reverser mechanism, such as a target-type thrust reverser.

As schematically illustrated in FIG. 2, when engine 30 is in the forward thrust configuration, thrust generator 44 receives an incoming airstream 32 and accelerates incoming airstream 32 to generate a forward thrust airstream 34 that flows in a forward thrust direction 36 to propel engine 30, and hence aircraft 10, in a direction opposite forward thrust direction 36. Alternatively, when engine 30 is in the reverse thrust configuration, and as schematically illustrated in FIG. 3, thrust generator 44 receives incoming airstream 32 and accelerates incoming airstream 32 to generate a reverse thrust airstream 38 that flows at least partially along a reverse thrust direction 40 that is opposite forward thrust direction 36. More specifically, when thrust reverser actuation system 50 transitions engine 30 from the forward thrust configuration to the reverse thrust configuration, the translation of transcowl 46 relative to nacelle 42 operates to redirect the accelerated airstream produced by thrust generator 44 to travel at least partially along reverse thrust direction 40. As a result, when aircraft 10 is moving forward through the air, reverse thrust airstream 38 operates to exert a force on engine 30 and/or aircraft 10 that reduces a speed of aircraft 10.

In this manner, thrust reverser actuation system 50 enables engine 30 to produce a thrust force to actively decelerate aircraft 10, such as to reduce a speed of aircraft 10 upon landing. Utilizing engines 30 that include thrust reverser actuation systems 50 may enable aircraft 10 to utilize shorter runways and/or to carry a greater load relative to aircraft that utilize engines that do not offer such thrust-reversing functionality. However, it is highly desirable that thrust reverser actuation system 50 be provided with safeguards against engine 30 transitioning to the reverse thrust configuration prematurely, such as while aircraft 10 remains airborne and/or when aircraft 10 is not imminently landing. Accordingly, and as described in more detail herein, thrust reverser actuation systems 50 according to the present disclosure include locking actuators 100 that restrict engine 30 from transitioning to the reverse thrust configuration inadvertently. More specifically, and as described in more detail herein, locking actuators 100 according to the present disclosure include lock assemblies 200 and/or lock status indicators 250 that may feature enhanced reliability and/or robustness relative to prior art designs.

Figure 4:
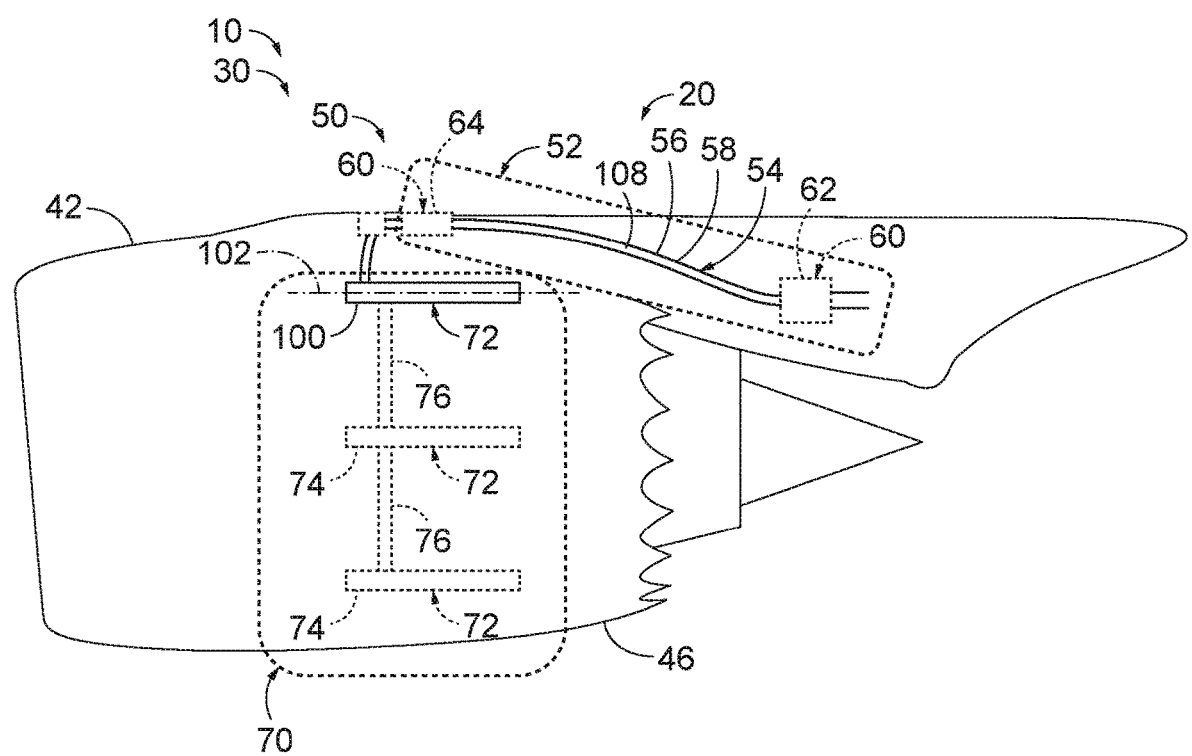
FIG. 4 is a schematic side elevation view illustrating an example of an engine with a thrust reverser actuation system according to the present disclosure.

FIG. 4 is a schematic representation of an example of a thrust reverser actuation system 50, such as may be incorporated into and/or associated with engine 30. As schematically illustrated in FIG. 4, thrust reverser actuation system 50 includes actuator assembly 70 operatively coupled to transcowl 46 such that actuator assembly 70 is configured to translate transcowl 46 along a direction parallel to an actuator axis 102. As further schematically illustrated in FIG. 4, thrust reverser actuation system 50 additionally includes a hydraulic control assembly 52 configured to regulate a flow of hydraulic fluid 108 to actuator assembly 70 to selectively transition engine 30 between the forward thrust configuration and the reverse thrust configuration, as described herein. Specifically, and as schematically illustrated in FIG. 4, hydraulic control assembly 52 includes one or more hydraulic conduits 54 for conveying hydraulic fluid 108 to and from actuator assembly 70. More specifically, as schematically illustrated in FIG. 4, hydraulic conduits 54 include a supply conduit 56 that conveys (e.g., supplies) hydraulic fluid 108 at a system pressure and a return conduit 58 that conveys (e.g., receives) hydraulic fluid 108 at a tank pressure that is less than the system pressure. The system pressure and the tank pressure each may be any appropriate hydraulic pressures, such as may correspond to and/or be utilized by one or more other aspects of aircraft hydraulic system 20 of aircraft 10.

As schematically illustrated in FIG. 4, hydraulic control assembly 52 further includes one or more hydraulic valves 60 configured to selectively fluidly couple supply conduit 56 and return conduit 58 to various components of actuator assembly 70, as described herein. In some examples, and as schematically illustrated in FIG. 4, hydraulic control assembly 52 is a component of, and/or is configured for use in conjunction with, aircraft hydraulic system 20 of aircraft 10. In such examples, aircraft hydraulic system 20 may supply hydraulic fluid 108 to hydraulic control assembly 52 and/or pressurize hydraulic fluid 108 to the system pressure.

In some examples, and as schematically illustrated in FIG. 4, actuator assembly 70 includes a plurality of transcowl actuators 72 that includes at least one locking actuator 100 according to the present disclosure. Stated differently, in such examples, the plurality of transcowl actuators includes locking actuator 100 in combination with one or more additional locking actuators 100 and/or one or more non-locking actuators 74 (e.g., transcowl actuators 72 that lack lock assemblies 200). In some such examples, and as schematically illustrated in FIG. 4, actuator assembly 70 further includes one or more synchronization tubes 76 operatively coupled to each transcowl actuator 72 to synchronize the operation of the plurality of transcowl actuators 72, such as via synchronized delivery of hydraulic fluid 108 to each transcowl actuator 72.

Figure 5:
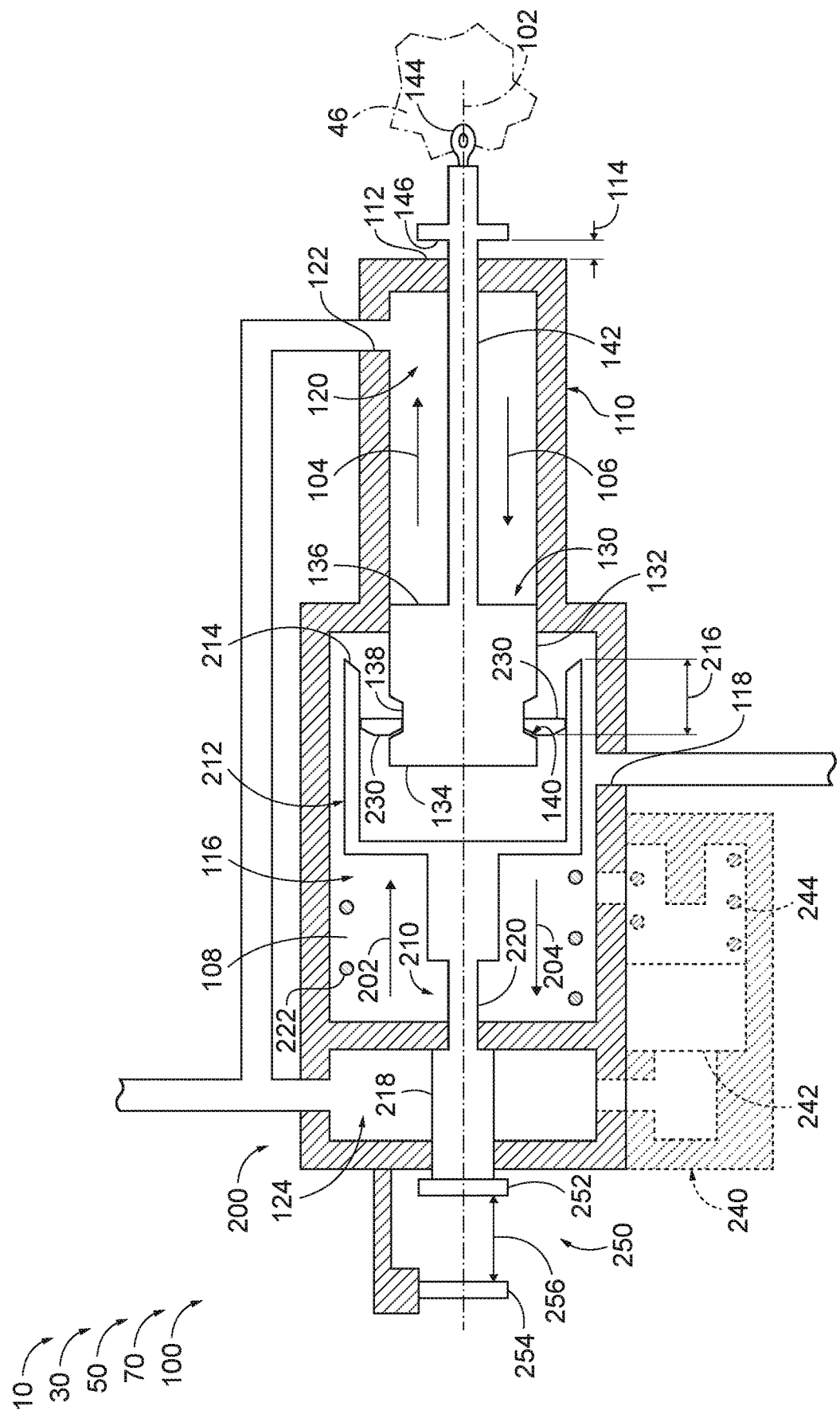
FIG. 5 is a schematic cross-sectional side view of an example of a locking actuator with an extension element in a loading position of a retracted state and with a lock assembly in a locked state according to the present disclosure.
Figure 6:
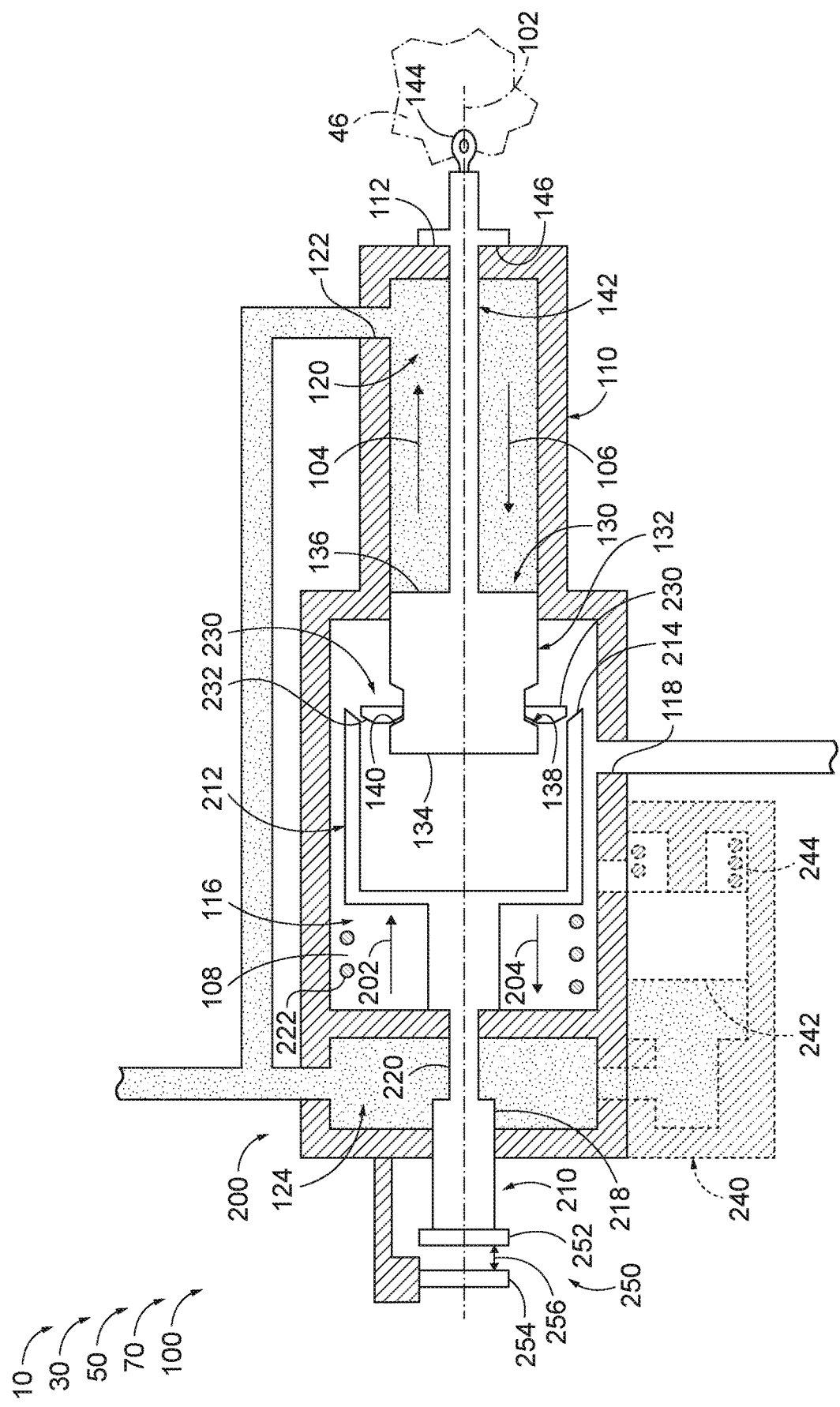
FIG. 6 is a schematic cross-sectional side view of the locking actuator of FIG. 5 with the extension element in an overstowed position of the retracted state and with the lock assembly in an unlocked state according to the present disclosure.
Figure 7:
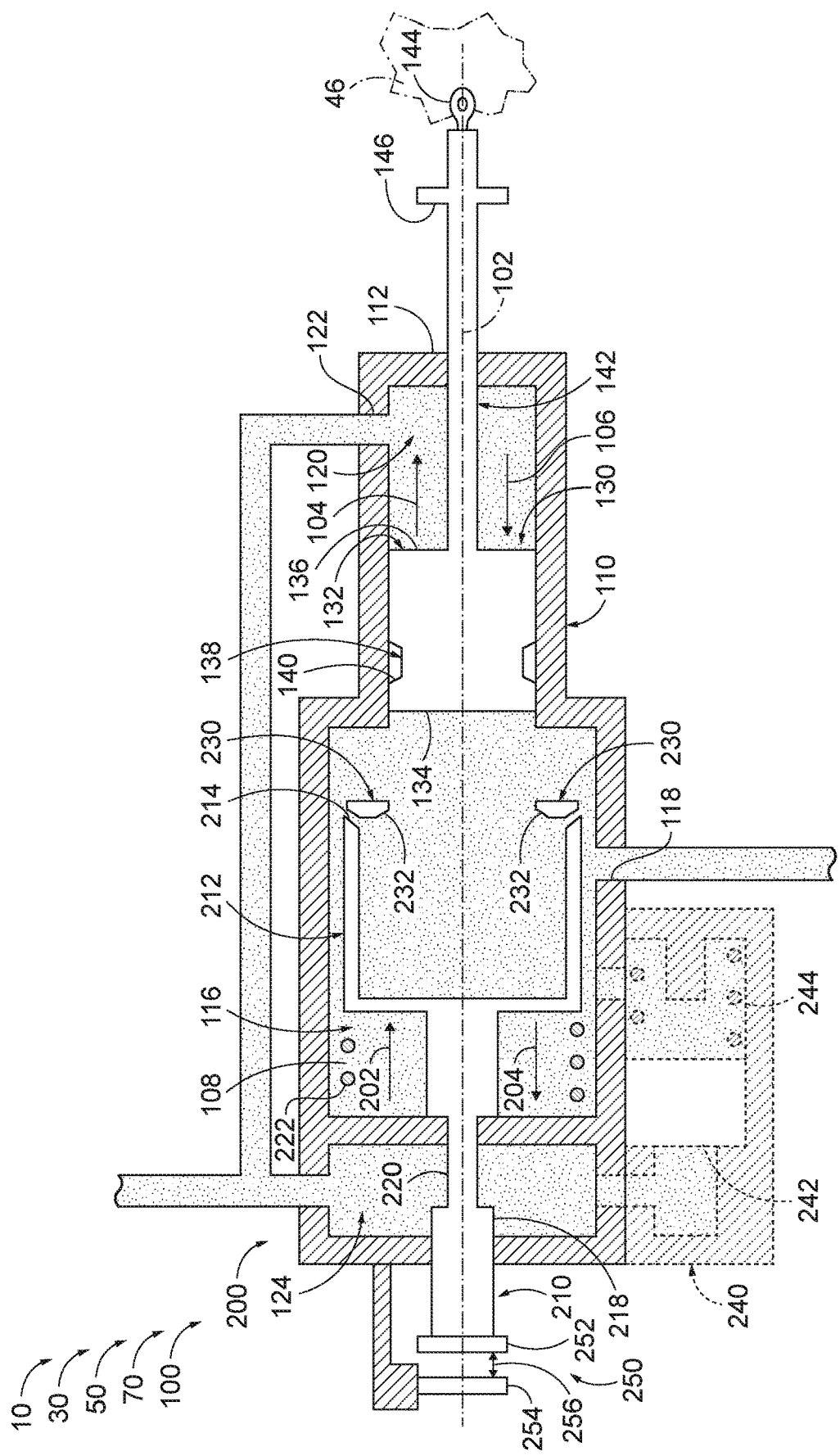
FIG. 7 is a schematic cross-sectional side view of the locking actuator of FIGS. 5-6 with the extension element in an extended state and with the lock assembly in the unlocked state according to the present disclosure.

FIGS. 5-7 schematically illustrate examples of locking actuators 100, such as may be included in aircraft 10, engines 30, thrust reverser actuation systems 50, and/or actuator assemblies 70 according to the present disclosure. As schematically illustrated in FIGS. 5-7, locking actuator 100 includes an actuator housing 110, an extension element 130 positioned at least partially within actuator housing 110, and a lock assembly 200. Extension element 130 is configured to be operatively coupled to transcowl 46 of engine 30 to transition engine 30 between the forward thrust configuration and the reverse thrust configuration. Specifically, and as schematically illustrated in FIGS. 5-7, extension element 130 defines and extends along actuator axis 102 of locking actuator 100, and extension element 130 is configured to translate along actuator axis 102 to selectively transition engine 30 between the forward thrust configuration and the reverse thrust configuration. More specifically, extension element 130 is configured to translate along actuator axis 102 to selectively transition extension element 130 between a retracted state (shown in FIGS. 5-6) that corresponds to the forward thrust configuration of engine 30 and an extended state (shown in FIG. 7) that corresponds to the reverse thrust configuration of engine 30. Stated differently, and as schematically illustrated in FIGS. 5-7, extension element 130 is configured to translate relative to actuator housing 110 along a deploying direction 104 that is parallel to actuator axis 102 as extension element 130 transitions from the retracted state toward the extended state. Similarly, extension element 130 is configured to translate relative to actuator housing 110 along a retracting direction 106 that is opposite deploying direction 104 as extension element 130 transitions from the extended state toward the retracted state.

Extension element 130 may have any appropriate structure for selectively translating along actuator axis 102 and/or for engaging transcowl 46. In some examples, and as schematically illustrated in FIGS. 5-7, extension element 130 includes an extension element piston 132 that is positioned within actuator housing 110 and a rod 142 statically coupled to extension element piston 132 and extending away from extension element piston 132. In such examples, rod 142 extends at least partially exterior of actuator housing 110 and terminates in a coupling terminal 144 that is positioned exterior of actuator housing 110, such that transcowl 46 may be operatively coupled to extension element 130 via coupling terminal 144. In some examples, and as described in more detail herein, extension element piston 132 is configured to be hydraulically actuated to transition extension element 130 between the retracted state and the extended state.

As described in more detail herein, lock assembly 200 is configured to selectively restrict extension element 130 from transitioning from the retracted state to the extended state, thereby selectively restricting engine 30 from transitioning from the forward thrust configuration to the reverse thrust configuration. Specifically, lock assembly 200 is configured to be selectively transitioned between a locked state (shown in FIG. 5), in which extension element 130 is mechanically restricted from transitioning from the retracted state to the extended state, and an unlocked state (shown in FIGS. 6-7), in which extension element 130 is free to transition from the retracted state to the extended state. As discussed in more detail herein, lock assembly 200 is configured to be selectively transitioned between the locked state and the unlocked state independent of transitioning extension element 130 between the retracted state and the extended state. Stated differently, and as described herein, transitioning extension element 130 between the retracted state and the extended state is performed via a process and/or mechanism that is distinct from (e.g., temporally spaced apart from, and/or responsive to a different input than) the process and/or mechanism that transitions lock assembly 200 between the locked state and the unlocked state.

In some examples, and as schematically illustrated in FIGS. 5-7, lock assembly 200 includes a lock member 210 with a lock sleeve 212 that is configured to translate relative to actuator housing 110 along a direction at least substantially parallel to actuator axis 102 as lock assembly 200 transitions between the locked state and the unlocked state. As an example, and as schematically illustrated in FIGS. 5-7, lock member 210 may be configured to translate relative to actuator housing 110 along an unlocking direction 204 as lock assembly 200 transitions from the locked state toward the unlocked state. Similarly, in such examples, lock member 210 is configured to translate relative to actuator housing 110 along a locking direction 202 that is opposite unlocking direction 204 as lock assembly 200 transitions from the unlocked state toward the locked state. In some examples, and as schematically illustrated in FIGS. 5-7, locking direction 202 is parallel to deploying direction 104. However, this is not required, and it is additionally within the scope of the present disclosure that locking direction 202 is antiparallel to deploying direction 104.

In some examples, and as schematically illustrated in FIGS. 5-7, lock assembly 200 includes a lock member bias spring 222 that biases lock member 210 in locking direction 202. Thus, in such examples, lock assembly 200 is biased toward the locked state, such that the locked state corresponds to a failsafe state of locking actuator 100. In particular, FIGS. 5-7 schematically illustrate an example in which lock member bias spring 222 is a coil spring. However, this is not required, and it is within the scope of the present disclosure that lock member bias spring 222 may include and/or be any appropriate structure and/or mechanism.

In some examples, and as schematically illustrated in FIGS. 5-7, locking actuator 100 includes a lock status indicator 250 with a lock indicator target 252 and a lock indicator sensor 254. In such examples, lock indicator sensor 254 is configured to sense a distance and/or proximity between lock indicator target 252 and lock indicator sensor 254, and lock status indicator 250 is configured to generate a lock status signal that represents a lock target distance 256 separating lock indicator sensor 254 and lock indicator target 252. In this manner, the lock status signal is at least partially based on lock target distance 256.

Lock indicator target 252 and lock indicator sensor 254 may include and/or be any appropriate materials and/or devices for generating the lock status signal without direct physical contact between lock indicator target 252 and lock indicator sensor 254, such as a magnetic and/or inductive sensing mechanism. As examples, lock indicator target 252 may include a metal, a nonferrous metal, a ferrous metal, and/or a ferromagnetic material, and lock indicator sensor 254 may include and/or be an inductive sensor and/or a magnetic sensor.

Lock status indicator 250 generally is configured such that lock target distance 256 varies depending upon a state of lock assembly 200. Stated differently, lock status indicator 250 is configured such that lock target distance 256 at least partially represents a position of lock member 210 relative to actuator housing 110, and thus represents whether lock assembly 200 is in the locked state or the unlocked state. As a more specific example, and as schematically illustrated in FIGS. 5-7, lock indicator target 252 may be fixedly coupled to lock member 210, and lock indicator sensor 254 may be at least substantially fixed relative to actuator housing 110. In other examples, lock indicator target 252 may be at least substantially fixed relative to actuator housing 110, and lock indicator sensor 254 may be fixedly coupled to lock member 210. In such examples, transitioning lock member 210 along actuator axis 102 to transition lock assembly 200 between the locked state and the unlocked state results in a corresponding variation of lock target distance 256. FIGS. 5-7 schematically illustrate an example in which lock status indicator 250 exhibits a "head-on" configuration, in which lock indicator target 252 moves directly toward and/or away from lock indicator sensor 254 (or vice-versa) as lock assembly 200 transitions between the locked state and the unlocked state. However, this is not required of all examples of lock status indicator 250, and it is additionally within the scope of the present disclosure that lock indicator target 252 and lock indicator sensor 254 may have any appropriate relative positional relationship.

Figure 8:
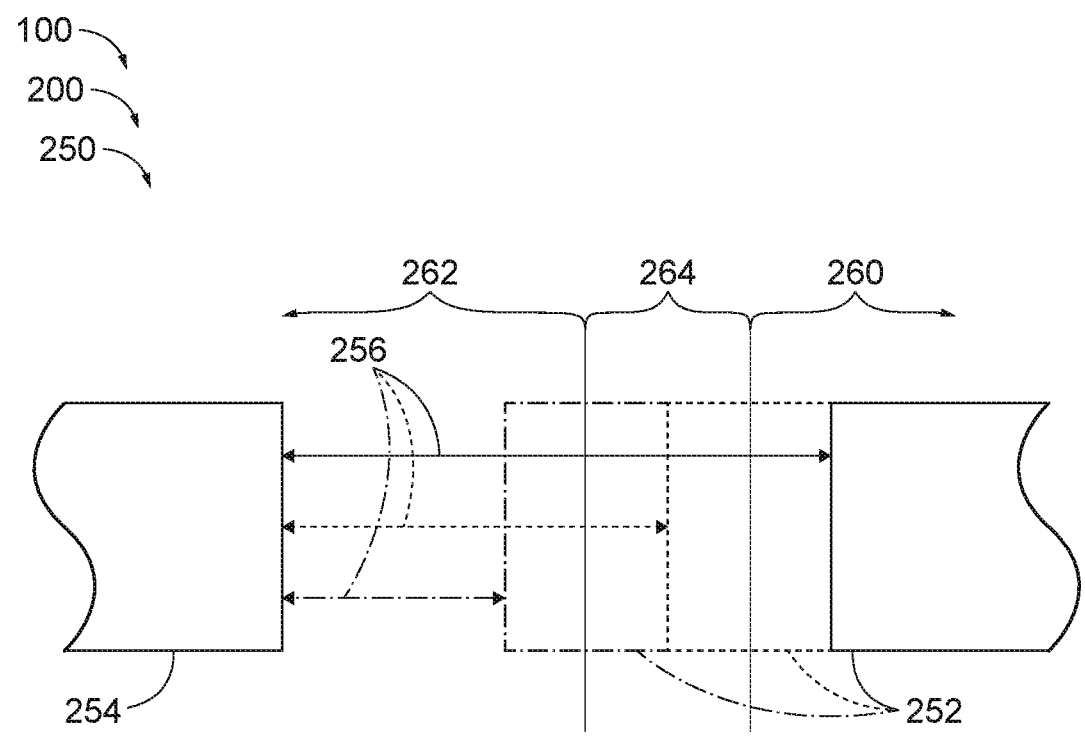
FIG. 8 is a schematic illustration of an example of a lock status indicator according to the present disclosure.

FIG. 8 is a schematic representation of an example of lock status indicator 250. As discussed, lock status indicator 250 generally is configured such that a measurement of lock target distance 256, such as with lock indicator sensor 254, enables producing an indication and/or an independent verification of whether lock assembly 200 is in the locked state or the unlocked state. As an example, and as schematically illustrated in FIGS. 5-7, lock assembly 200 may be configured such that lock assembly 200 is in the locked state when lock member 210 being positioned and/or translated sufficiently far in the direction of locking direction 202 (e.g., relative to actuator housing 110 and/or extension element 130) such that lock sleeve 212 is appropriately positioned relative to extension element 130, as described in more detail below. Accordingly, in such examples, and with reference to FIGS. 5-8, lock status indicator 250 is configured such that the lock status signal indicates that lock assembly 200 (shown in FIGS. 5-7) is in the locked state when lock target distance 256 is within a locked target distance range 260 (shown in FIG. 8). Similarly, in such examples, lock status indicator 250 is configured such that the lock status signal indicates that lock assembly 200 is in the locked state when lock target distance 256 is within an unlocked target distance range 262. FIG. 8 schematically illustrates examples in which lock indicator target 252 is separated from lock indicator sensor 254 by various lock target distances 256. Specifically, FIG. 8 schematically illustrates in solid lines an example in which lock indicator target 252 is separated from lock indicator sensor 254 by a lock target distance 256 that is within locked target distance range 260, corresponding to a configuration in which lock assembly 200 is in the locked state. Additionally, FIG. 8 schematically illustrates in dash-dot lines an example in which lock indicator target 252 is separated from lock indicator sensor 254 by a lock target distance 256 that is within unlocked target distance range 262, corresponding to a configuration in which lock assembly 200 is in the unlocked state.

In some examples, lock status indicator 250 may be configured such that a given value of lock target distance 256 does not always correspond to and/or result in the lock status signal indicating the same state of lock assembly 200. For example, statistical and/or manufacturing variability among a population of lock indicator sensors 254 may yield a degree of uncertainty regarding the relationship between lock target distance 256 and the corresponding lock status signal as produced by a selected (e.g., a particular) lock indicator sensor 254. Additionally or alternatively, lock status indicator 250 may utilize a non-contact distance measurement that relies upon magnetic and/or inductive sensing and that exhibits a degree of hysteresis, such that the lock status signal is based not only on lock target distance 256 but also on a state history of lock status indicator 250. Thus, in some such examples, and as further schematically illustrated in FIG. 8, locked target distance range 260 and unlocked target distance range 262 are not immediately adjacent to one another, but instead are separated by a sensing uncertainty range 264. For example, when lock target distance 256 is within sensing uncertainty range 264, hysteresis effects may result in the lock status signal being at least partially based upon whether lock target distance 256 was more recently within locked target distance range 260 or unlocked target distance range 262. That is, in such examples, when lock indicator target 252 is separated from lock indicator sensor 254 by a lock target distance 256 that is within sensing uncertainty range 264 (as schematically illustrated in dashed lines in FIG. 8), the lock status signal alone generally does not provide sufficient information to uniquely determine lock target distance 256. Accordingly, when lock target distance 256 is within sensing uncertainty range 264, lock status indicator 250 may be unable to reliably and conclusively determine whether lock assembly 200 is in the locked state or in the unlocked state. Accordingly, it is desirable that locking actuator 100 be configured such that lock member 210 traverses a distance that exceeds a width of sensing uncertainty range 264 as lock assembly 200 transitions from the locked state to the unlocked state, such that lock target distance 256 is within unlocked target distance range 262 only when lock assembly 200 is in the unlocked state. In this manner, lock status indicator 250 may be regarded as producing a reliable indication of when lock assembly 200 is in the unlocked state.

As discussed, lock member 210 is configured to translate relative to actuator housing 110 to transition lock assembly 200 between the locked state and the unlocked state. In some examples, there exists a range of positions of lock member 210 relative to actuator housing 110 in which lock assembly 200 is in the locked state (e.g., positions in which lock target distance 256 is within locked target distance range 260). Similarly, in some examples, there exists a range of positions of lock member 210 relative to actuator housing 110 in which lock assembly 200 is in the unlocked state (e.g., positions in which lock target distance 256 is within unlocked target distance range 262). Accordingly, lock member 210 may be described as translating relative to actuator housing 110 to transition among a plurality of positions defined between and including a fully locked position (schematically illustrated in FIG. 5) and a fully unlocked position (schematically illustrated in FIGS. 6-7). Specifically, when lock member 210 is in the fully locked position, lock sleeve 212 is at its maximum operative position in locking direction 202, and when lock member 210 is in the fully unlocked position, lock sleeve 212 is at its maximum operative position in unlocking direction 204. For example, when lock member 210 is in the fully locked position, lock member 210 may be physically restricted from translating further in locking direction 202, such as due to obstruction by actuator housing 110 and/or another component of locking actuator 100. Similarly, when lock member 210 is in the fully unlocked position, lock member 210 may be physically restricted from translating further in unlocking direction 204, such as due to obstruction by lock member bias spring 222 and/or another component of locking actuator 100.

In this manner, lock assembly 200 may be described as being in the locked state at least when lock member 210 is in the fully locked position, and lock assembly 200 may be described as being in the unlocked state at least when lock member 210 is in the fully unlocked position. In some examples, however, there additionally exists a range of positions of lock member 210 relative to actuator housing 110 in which lock member 210 is not in the fully locked position but in which lock assembly 200 still is in the locked state. Accordingly, in such examples, transitioning lock assembly 200 from the locked state (with lock member 210 in the fully locked position) to the unlocked state includes translating lock member 210 relative to actuator housing 110 by a sufficient distance to traverse the full range of positions corresponding to the locked state and thus reach the unlocked state. More specifically, in such examples, and as schematically illustrated in FIG. 5, lock assembly 200 is configured to transition from the locked state in which lock member 210 is in the fully locked position to the unlocked state when lock member 210 translates relative to actuator housing 110 along unlocking direction 204 by at least a lock sleeve overlap distance 216. As discussed in more detail below, lock sleeve overlap distance 216 may correspond to a distance between lock member 210 and one or more other components of lock assembly 200 when lock member 210 is in the fully locked position.

In some examples, lock assembly 200 is configured such that lock sleeve overlap distance 216 is greater than a range of distances encompassed by sensing uncertainty range 264 of lock status indicator 250. Accordingly, in some such examples, lock assembly 200 is configured such that lock target distance 256 is within sensing uncertainty range 264 only while lock member 210 remains in a position corresponding to the locked state of lock assembly 200. Stated differently, in such examples, lock assembly 200 is configured such that lock target distance 256 is within unlocked target distance range 262 only when lock assembly 200 is in the unlocked state. In this manner, the existence of a non-negligible sensing uncertainty range 264 does not restrict lock status indicator 250 from providing a reliably accurate indication that lock assembly 200 is in the unlocked state.

As discussed, when lock assembly 200 is in the locked state and extension element 130 is in the retracted state, lock assembly 200 operates to mechanically restrict extension element 130 from transitioning toward the extended state. More specifically, and as schematically illustrated in FIG. 5, in an example in which lock assembly 200 is in the locked state and includes lock sleeve 212, lock sleeve 212 is positioned to restrict translation of extension element 130 toward the extended state, thereby maintaining extension element 130 in the retracted state.

Lock assembly 200 may be configured to mechanically retain extension element 130 in the retracted state via any appropriate structure and/or mechanism. In some examples, and as schematically illustrated in FIGS. 5-7, lock assembly 200 includes one or more lock bars 230, and extension element piston 132 defines one or more lock bar receivers 138. In such examples, each lock bar 230 is configured to transition between an engaged configuration (schematically illustrated in FIGS. 5-6) and a disengaged configuration (schematically illustrated in FIG. 7). Specifically, each lock bar 230 is received within a corresponding lock bar receiver 138 when each lock bar 230 is in the engaged configuration, and each lock bar 230 is removed from the corresponding lock bar receiver 138 when each lock bar 230 is in the disengaged configuration.

In such examples, and as schematically illustrated in FIG. 5, when lock assembly 200 is in the locked state, lock sleeve 212 is positioned to restrict each lock bar 230 from transitioning from the engaged configuration to the disengaged configuration. That is, each lock bar 230 may be at least partially restricted from translating relative to actuator housing 110 along a direction parallel to actuator axis 102, such that extension element 130 may be transitioned toward the extended state only subsequent to transitioning each lock bar 230 to the disengaged configuration (i.e., along a direction perpendicular to actuator axis 102). By contrast, when lock assembly 200 is in the unlocked state, and as schematically illustrated in FIGS. 6-7, lock sleeve 212 is positioned to permit each lock bar 230 to transition from the engaged configuration (shown in FIG. 6) to the disengaged configuration (shown in FIG. 7).

In some examples, extension element piston 132 may include lock bar receiver 138 in the form of a single circumferential groove or recess extending around a circumference of extension element piston 132 for receiving each of the one or more lock bars 230. In other examples, extension element piston 132 may include a plurality of spaced-apart lock bar receivers 138, each of which is configured to receive a corresponding subset of a plurality of lock bars 230.

In some examples, lock sleeve 212 may include and/or be a hollow circumferential sleeve that extends fully around actuator axis 102 to restrict each of the one or more lock bars 230 from transitioning to the disengaged configuration when lock assembly 200 is in the locked state. In other examples, lock sleeve 212 may include a plurality of spaced-apart sleeve segments, each of which is configured to restrict a corresponding subset of a plurality of lock bars 230 from transitioning to the disengaged configuration when lock assembly 200 is in the locked state.

Each lock bar 230 may be configured to transition between the engaged configuration and the disengaged configuration in any appropriate manner. In some examples, and as schematically illustrated in FIGS. 5-7, each lock bar 230 is configured to translate radially away from actuator axis 102 as each lock bar 230 transitions from the engaged configuration toward the disengaged configuration. Similarly, in such examples, each lock bar 230 is configured to translate radially toward actuator axis 102 as each lock bar 230 transitions from the disengaged configuration toward the engaged configuration.

In such examples, each lock bar 230 may be configured to translate radially responsive to any appropriate force. In some examples, and as schematically illustrated in FIGS. 5-7, extension element piston 132 includes one or more receiver engagement surfaces 140, such as sloped surfaces, that partially define corresponding lock bar receivers 138 and that are configured to engage the corresponding lock bar 230. In such examples, and as schematically illustrated in FIG. 5, when lock assembly 200 is in the locked state and extension element 130 is in the retracted state, physical engagement between each lock bar 230 and the corresponding receiver engagement surface 140 operates to restrict extension element 130 from translating relative to actuator housing 110 in deploying direction 104. That is, in the example of FIG. 5, in which lock assembly 200 is in the locked state and extension element 130 is in the retracted state, lock sleeve 212 is positioned to restrict each lock bar 230 from translating radially outward, thus maintaining each lock bar 230 in the corresponding lock bar receiver 138. Accordingly, when lock assembly 200 is in the locked state and extension element 130 is in the retracted state, engagement between each lock bar 230 and the corresponding receiver engagement surface 140 restricts extension element 130 from translating relative to actuator housing 110 in deploying direction 104. In some examples, and as schematically illustrated in FIG. 5, when lock member 210 is in the fully locked position, lock sleeve 212 extends beyond each lock bar 230 along locking direction 202 by lock sleeve overlap distance 216. In this manner, in such examples, each lock bar 230 is free to transition from the engaged configuration to the disengaged configuration only when lock member 210 is translated away from the fully locked position along unlocking direction 204 by a distance that is at least equal to lock sleeve overlap distance 216.

By contrast, when lock assembly 200 is transitioned to the unlocked state, each lock bar 230 is free to transition from the engaged configuration to the disengaged configuration. Specifically, in such examples, when lock assembly 200 is in the unlocked state and when each lock bar 230 is initially in the engaged configuration (e.g., as schematically illustrated in FIG. 6), translating extension element 130 relative to actuator housing 110 along deploying direction 104 urges each receiver engagement surface 140 into contact with the corresponding lock bar(s) 230 such that each receiver engagement surface 140 urges the corresponding lock bar(s) 230 to transition from the engaged configuration toward the disengaged configuration.

Each lock bar 230 also may be configured to transition from the disengaged configuration to the engaged configuration in any manner and/or responsive to any appropriate force. In some examples, and as schematically illustrated in FIGS. 5-7, lock sleeve 212 includes one or more sleeve engagement surfaces 214 that are configured to engage lock bar(s) 230. Specifically, in such examples, when lock assembly 200 is initially in the unlocked state and each lock bar 230 is initially in the disengaged configuration, translating lock member 210 relative to actuator housing 110 in locking direction 202 urges each sleeve engagement surface 214 into physical engagement with one or more corresponding lock bars 230 such that sleeve engagement surface(s) 214 urge lock bar(s) 230 to transition from the disengaged configuration toward the engaged configuration. In some examples, and as schematically illustrated in FIGS. 5-7, lock bar 230 includes one or more bar engagement surfaces 232 (labeled in FIGS. 6-7), such as sloped surfaces, configured to engage receiver engagement surface 140 and/or sleeve engagement surface 214 as lock bar 230 transitions between the engaged configuration and the disengaged configuration.

As discussed, extension element 130 is configured to translate relative to actuator housing 110 to transition extension element 130 between the retracted state and the extended state. In some examples, there exists a range of positions of extension element 130 relative to actuator housing 110 in which extension element 130 is in the retracted state. Specifically, in some such examples, extension element 130 is configured to translate relative to actuator housing 110 along actuator axis 102 while extension element 130 is in the retracted state to transition extension element 130 among a plurality of positions defined between and including a loading position (schematically illustrated in FIG. 5) and an overstowed position (schematically illustrated in FIG. 6).

FIG. 5 schematically illustrates an example in which extension element 130 is in the loading position. Specifically, when extension element 130 is in the loading position, extension element 130 is restricted from translating further in deploying direction 104 when lock assembly 200 is in the locked state, such as due to physical engagement between lock assembly 200 and extension element 130. More specifically, in the example of FIG. 5, when lock assembly 200 is in the locked state, positive engagement between each lock bar 230 and extension element piston 132 restricts extension element 130 from transitioning away from the retracted state. In this manner, extension element piston 132 may be described as "loading" each lock bar 230. Specifically, in some examples, extension element 130 is slightly biased toward deploying direction 104 when extension element 130 is in the loading position, such as due to a drag force on transcowl 46. Accordingly, in some such examples, it may be desirable that extension element 130 transitions away from the loading position, such as to the overstowed position, prior to lock assembly 200 transitioning from the locked state to the unlocked state in order to reduce a risk of jamming the lock bar(s) 230. Thus, in such examples, transitioning locking actuator 100 from a configuration in which extension element 130 is in the loading position of the retracted state and in which lock assembly 200 is in the locked state to a configuration in which extension element 130 is in the extended state includes first translating extension element 130 relative to actuator housing 110 along retracting direction 106 to unload each lock bar 230 and subsequently translating extension element 130 relative to actuator housing 110 along deploying direction 104 to transition extension element 130 to the extended state.

FIG. 6 schematically illustrates an example in which extension element 130 is in the overstowed position. Specifically, when extension element 130 is in the overstowed position, extension element 130 is restricted from translating further in retracting direction 106. Specifically, in some examples, and as schematically illustrated in FIGS. 5-7, extension element 130 includes and/or defines a rod stop 146 that is statically coupled to rod 142, and actuator housing 110 includes and/or defines a housing stop 112 that selectively engages rod stop 146. More specifically, in such examples, rod stop 146 is configured to selectively engage housing stop 112 to restrict motion of extension element 130 in retracting direction 106 when extension element 130 is in the overstowed position. In this manner, rod stop 146 and/or housing stop 112 may be described as at least partially defining the overstowed position. In some examples, and as schematically illustrated in FIG. 5, when extension element 130 is in the loading position, housing stop 112 and rod stop 146 are spaced apart by an overstow distance 114. Accordingly, in such examples, extension element 130 translates relative to actuator housing 110 along retracting direction 106 by a distance substantially equal to overstow distance 114 as extension element 130 transitions from the loading position to the overstowed position.

In some examples, locking actuator 100 is configured to transition extension element 130 between the retracted state and the extended state, and/or to transition lock assembly 200 between the locked state and the unlocked state, responsive to hydraulic pressure. Specifically, in some examples, and as schematically illustrated in FIGS. 5-7, actuator housing 110 defines a deploy chamber 116 and a retract chamber 120 that are fluidly isolated from one another, and locking actuator 100 includes hydraulic fluid 108 occupying each of deploy chamber 116 and retract chamber 120. In such examples, a hydraulic pressure of hydraulic fluid 108 occupying deploy chamber 116 may be referred to as a deploy fluid pressure, while a hydraulic pressure of hydraulic fluid 108 occupying retract chamber 120 may be referred to as a retract fluid pressure. Accordingly, in such examples, locking actuator 100 is configured to transition extension element 130 between the retracted state and the extended state at least partially via selective variation of the deploy fluid pressure and/or the retract fluid pressure, as described herein. In such examples, and as schematically illustrated in FIGS. 5-7, actuator housing 110 includes a deploy port 118 that permits fluid access to deploy chamber 116 and a retract port 122 that permits fluid access to retract chamber 120. Thus, as described herein, locking actuator 100 may be configured to transition extension element 130 between the retracted state and the extended state via selective variation of the hydraulic pressure of hydraulic fluid 108 that is supplied to deploy port 118 and to retract port 122. More specifically, and as described herein, locking actuator 100 may be configured to transition extension element 130 between the retracted state and the extended state by selectively establishing and/or blocking fluid communication between one or both of deploy port 118 and retract port 122 and one or both of supply conduit 56 and return conduit 58 of hydraulic control assembly 52.

As discussed, locking actuator 100 generally is configured such that transitioning lock assembly 200 from the locked state to the unlocked state is performed independent of (e.g., strictly prior to) transitioning extension element 130 from the retracted state to the extended state. More specifically, in some examples, transitioning lock assembly 200 between the locked state and the unlocked state is performed at least substantially via selective variation of the retract fluid pressure, while transitioning extension element 130 between the retracted state and the extended state is performed at least partially via selective variation of the deploy fluid pressure. As a more specific example, lock assembly 200 may be configured to transition from the locked state to the unlocked state when the retract fluid pressure is greater than (e.g., rises above) a threshold unlock pressure. Specifically, in some examples, and as schematically illustrated in FIGS. 5-7, actuator housing 110 additionally defines an unlock chamber 124 that is fluidly connected to retract chamber 120 such that hydraulic fluid 108 occupies unlock chamber 124 at a hydraulic pressure that is at least substantially equal to the retract fluid pressure. In such examples, and as schematically illustrated in FIGS. 5-7, lock member 210 includes a lock piston 218 extending at least partially within unlock chamber 124. In such examples, lock assembly 200 is configured such that, when the retract fluid pressure is greater than the threshold unlock pressure, hydraulic fluid 108 within unlock chamber 124 urges lock piston 218 to translate in unlocking direction 204, thereby transitioning lock assembly 200 toward the unlocked state. Lock piston 218 may be operatively coupled to a remainder of lock member 210 in any appropriate manner. For example, and as schematically illustrated in FIGS. 5-7, lock member 210 may include a lock member shaft 220 that extends between lock sleeve 212 and lock piston 218 to fixedly couple lock sleeve 212 and lock piston 218 to one another. In some examples, and as schematically illustrated in FIGS. 5-7, lock sleeve 212 is positioned within deploy chamber 116, and at least a portion of lock member 210 (such as lock member shaft 220) extends out of deploy chamber 116.

Extension element 130 may be configured to transition between the retracted state and the extended state responsive to any appropriate hydraulic pressures and/or conditions. In some examples, such as in the examples of FIGS. 5-7, extension element 130 is configured to translate in deploying direction 104 when the deploy fluid pressure is greater than a threshold deploy pressure and when a ratio of the deploy fluid pressure to the retract fluid pressure is greater than a threshold pressure ratio. Specifically, in some examples, and as schematically illustrated in FIGS. 5-7, extension element piston 132 at least partially fluidly isolates deploy chamber 116 and retract chamber 120 from one another. Accordingly, in such examples, extension element piston 132 receives a hydraulic force from hydraulic fluid 108 within deploy chamber 116 that urges extension element 130 in deploying direction 104, and extension element piston 132 also receives a hydraulic force from hydraulic fluid 108 within retract chamber 120 that urges extension element 130 in retracting direction 106. Thus, in such examples, extension element 130 translates in deploying direction 104 when the hydraulic force produced by the deploy fluid pressure within deploy chamber 116 is sufficiently high to overcome the hydraulic force produced by the retract fluid pressure within retract chamber 120 that otherwise operates to maintain extension element 130 in the retracted state. Similarly, in such examples, extension element 130 is configured to translate in retracting direction 106 when the ratio of the deploy fluid pressure to the retract fluid pressure is less than the threshold pressure ratio.

In some examples, the threshold pressure ratio for translating extension element 130 in deploying direction 104 may be at most 1:1, and optionally may be less than 1:1. Specifically, the hydraulic force applied to extension element piston 132 depends on both the hydraulic pressure of hydraulic fluid 108 that contacts extension element piston 132 as well as a surface area of extension element piston 132 facing hydraulic fluid 108. Thus, hydraulic fluid 108 within deploy chamber 116 may exert a greater hydraulic force on extension element piston 132 than hydraulic fluid 108 within retract chamber 120 even when the deploy fluid pressure and the retract fluid pressure are substantially equal. More specifically, in some examples, and as schematically illustrated in FIGS. 5-7, extension element piston 132 has a deploy piston head 134 that faces deploy chamber 116 and a retract piston head 136 that faces retract chamber 120 such that a deploy piston head area of deploy piston head 134 is greater than a retract piston head area of retract piston head 136. Specifically, the deploy piston head area and the retract piston head area each are measured perpendicular to actuator axis 102 (e.g. as projected onto a plane perpendicular to actuator axis 102). In this manner, pressurizing hydraulic fluid 108 within each of deploy chamber 116 and retract chamber 120 such that the deploy fluid pressure is substantially equal to the retract fluid pressure may result in extension element piston 132 receiving a hydraulic force along deploying direction 104 that is greater than a hydraulic force along retracting direction 106, resulting in a net hydraulic force that operates to transition extension element 130 toward the extended state.

In some examples, and as further schematically illustrated in FIGS. 5-7, locking actuator 100 further includes a volume compensator 240 with a volume compensator piston 242 for at least partially regulating a volume of hydraulic fluid 108 within deploy chamber 116. For example, in an example in which lock sleeve 212 is operatively coupled to lock piston 218 via lock member shaft 220, translation of lock member 210 along unlocking direction 204 may result in lock member 210 occupying a smaller volume of deploy chamber 116, as a result of lock member shaft 220 translating out of deploy chamber 116. Accordingly, and as described herein, volume compensator piston 242 may be configured to translate relative to actuator housing 110 as lock member shaft 220 translates out of deploy chamber 116 so as to maintain a substantially constant volume within deploy chamber 116, thereby avoiding a cavitation of hydraulic fluid 108 within deploy chamber 116. As used herein, the term "volume," as used to describe a characteristic of a structure and/or a chamber (such as deploy chamber 116), generally refers to a volumetric extent (e.g., a capacity) of the structure and/or chamber, such as a volume that may be occupied by hydraulic fluid 108 (and/or a volume of hydraulic fluid 108 that would fully and uniformly occupy the structure and/or chamber) during operative use of locking actuator 100.

When present, and as schematically illustrated in FIGS. 5-7, volume compensator piston 242 is exposed to both of deploy chamber 116 and unlock chamber 124. Stated differently, in such examples, volume compensator piston 242 receives a hydraulic force from hydraulic fluid 108 within deploy chamber 116 as well as from hydraulic fluid 108 within unlock chamber 124. In such examples, volume compensator piston 242 is configured to transition among a plurality of positions defined between and including an extended position (schematically illustrated in FIGS. 5 and 7) and a retracted position (schematically illustrated in FIG. 6). As schematically illustrated in FIGS. 5-7, volume compensator 240 additionally includes a compensator bias spring 244 that biases volume compensator piston 242 toward the extended position. In some such examples, volume compensator piston 242 is configured to transition from the extended position toward the retracted position when the retract fluid pressure is greater than the threshold unlock pressure. Stated differently, compensator bias spring 244 may be configured such that volume compensator piston 242 compresses, and/or otherwise translates against the biasing force of, compensator bias spring 244 when the retract fluid pressure is greater than the threshold unlock pressure, and/or when the retract fluid pressure is greater than the deploy fluid pressure. In this manner, and as described herein, volume compensator piston 242 may be configured to transition between the extended position and the retracted position to maintain an at least substantially constant volume within deploy chamber 116 as lock assembly 200 transitions between the locked state and the unlocked state.

FIGS. 5-7 collectively may be described as illustrating a process by which locking actuator 100 may be transitioned from a configuration in which extension element 130 is in the retracted state and in which lock assembly 200 is in the locked state to a configuration in which extension element 130 is in the extended state. Specifically, and as discussed, FIG. 5 schematically illustrates a configuration in which extension element 130 is in the loading position of the retracted state and in which lock assembly 200 is in the locked state with lock member 210 in the fully locked position. In the configuration of FIG. 5, lock indicator target 252 is spaced apart from lock indicator sensor 254 by lock target distance 256 that is within locked target distance range 260 (as schematically illustrated in FIG. 8). FIG. 5 may be described as schematically illustrating a configuration in which the retract fluid pressure and the deploy fluid pressure each are at a tank pressure, such as the tank pressure of thrust reverser actuation system 50, such as may be less than the threshold unlock pressure and/or the threshold deploy pressure.

Relative to the configuration of FIG. 5, FIG. 6 schematically illustrates a configuration in which the retract fluid pressure has been raised above the threshold unlock pressure, as illustrated by the shading within retract chamber 120 and within unlock chamber 124. Accordingly, FIG. 6 schematically illustrates a configuration in which lock member 210 has been transitioned from the fully locked position to the fully unlocked position as a result of the hydraulic pressure within unlock chamber 124 translating lock piston 218 in unlocking direction 204. As a result, in the configuration of FIG. 6, lock target distance 256 is within unlocked target distance range 262 (as schematically illustrated in FIG. 8), and each lock bar 230 is no longer restricted from transitioning to the disengaged configuration. Additionally, raising the retracting fluid pressure above the threshold unlocking pressure transitions volume compensator piston 242 to the retracted state schematically illustrated in FIG. 6, thereby maintaining a substantially constant volume within deploy chamber 116 as lock member 210 translates out of deploy chamber 116. Furthermore, because retract chamber 120 and unlock chamber 124 are fluidly connected, raising the retract fluid pressure above the threshold unlock pressure also operates to translate extension element 130 in retracting direction 106 to the overstowed position, thereby unloading each lock bar 230. Accordingly, in the configuration of FIG. 6, lock assembly 200 is in the unlocked state, while extension element 130 remains in the retracted state because the retract fluid pressure is sufficiently greater than the deploy fluid pressure (e.g., such that the ratio of the deploy fluid pressure to the retract fluid pressure is less than the threshold pressure ratio).

FIG. 6 may be described as schematically illustrating a configuration of locking actuator 100 that distinguishes locking actuator 100 from prior locking hydraulic actuators for thrust reverser systems. In particular, in some examples, prior locking hydraulic actuators lack a structure analogous to unlock chamber 124, instead relying upon pressurization of a common volume of hydraulic fluid to both unlock a lock mechanism (e.g., a lock mechanism that is similar to lock assembly 200) as well as to transition an actuator arm (e.g., an actuator arm that is similar to extension element 130) to an extended state. Because these actions both are performed responsive to the same hydraulic pressurization, the unlocking of the lock mechanism of such prior hydraulic actuators must take place relatively quickly to permit the actuator arm to transition to its extended state without impedance by the lock assembly. By contrast, and as schematically illustrated in FIG. 6, locking actuators 100 according to the present disclosure enable lock assembly 200 to transition from the locked state to the unlocked state responsive to pressurization of retract chamber 120 and of unlock chamber 124, such that lock assembly 200 transitions to the unlocked state while the retract fluid pressure is greater than the deploy fluid pressure. This functional separation of the steps of transitioning lock assembly 200 from the locked state to the unlocked state and transitioning extension element 130 from the retracted state to the extended state thus enables these steps to be separated by any appropriate time delay, such as a delay that is sufficient to ensure that lock member 210 has transitioned from the fully locked position to the fully unlocked position prior to initiating translation of extension element 130. This in turn enables a configuration in which lock sleeve overlap distance 216 (schematically illustrated in FIG. 5) may be larger than in prior art designs in which the unlocking of lock assembly 200 must take place relatively quickly. In particular, such a configuration enables configuring lock sleeve overlap distance 216 to be greater than a range of distances associated with sensing uncertainty range 264 of lock status indicator 250 (as schematically illustrated in FIG. 8), thus enabling a configuration in which a component of lock status indicator 250 (i.e., lock indicator target 252 or lock indicator sensor 254) is fixedly coupled to lock member 210.

Relative to the configuration of FIG. 6, FIG. 7 schematically illustrates a configuration in which the retract fluid pressure remains above the threshold unlock pressure and which the deploy fluid pressure has been raised above the threshold deploy pressure, as illustrated by the shading within deploy chamber 116, specifically such that the ratio of the deploy fluid pressure to the retract fluid pressure is greater than the threshold pressure ratio. Accordingly, FIG. 7 schematically illustrates a configuration in which the deploy fluid pressure has translated extension element 130 to the extended state, and in which each lock bar 230 has transitioned from the engaged state to the disengaged state due to engagement between each lock bar 230 and the corresponding sloped receiver engagement surface 140.

In some examples, transitioning locking actuator 100 from the configuration of FIG. 7 to the configuration of FIG. 5 includes returning the deploy fluid pressure to a pressure (e.g., the tank pressure of hydraulic control assembly 52) that is below the threshold deploy pressure to transition extension element 130 to the overstowed position of the retracted state, and subsequently returning the retract fluid pressure to a pressure that is below the threshold unlocking pressure (e.g., the tank pressure). Accordingly, lock member bias spring 222 may then transition lock member 210 toward the fully locked state, thereby urging each lock bar 230 to the engaged configuration via engagement between each lock bar 230 and the corresponding sleeve engagement surface 214.

Figure 9:
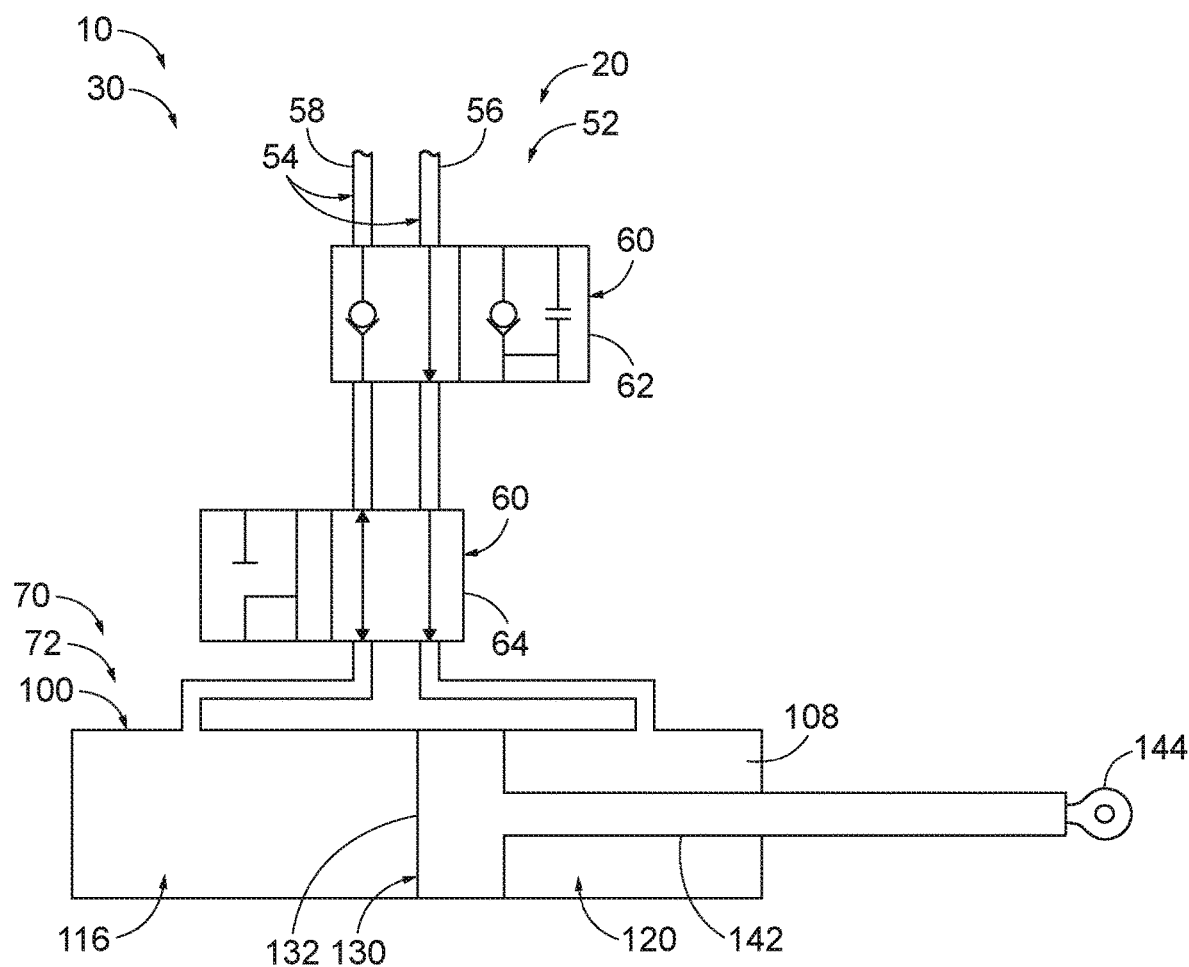
FIG. 9 is a schematic representation of an example of a portion of a thrust reverser actuation system according to the present disclosure.

FIG. 9 schematically illustrates examples of hydraulic control assemblies 52 for regulating the flow and/or pressure of hydraulic fluid 108 to locking actuator 100. Specifically, FIG. 9 schematically illustrates examples of hydraulic valves 60 that may be utilized to operatively couple supply conduit 56 and return conduit 58 to deploy chamber 116 and/or retract chamber 120 of locking actuator 100. More specifically, FIG. 9 schematically illustrates an example in which a first hydraulic valve 60 of hydraulic control assembly 52 is an isolation valve 62 and in which a second hydraulic valve 60 is a directional control valve 64.

In some examples, and as schematically illustrated in FIG. 9, isolation valve 62 is configured to selectively isolate supply conduit 56 from locking actuator 100, while directional control valve 64 is configured to selectively fluidly couple deploy chamber 116 and retract chamber 120 to one another. As a more specific example, FIG. 9 schematically illustrates a configuration in which isolation valve 62 is in its left-hand position as schematically illustrated in FIG. 9 and in which directional control valve 64 is in its right-hand position as schematically illustrated in FIG. 9. Accordingly, FIG. 9 schematically illustrates a configuration in which supply conduit 56 is fluidly coupled to retract chamber 120 and in which deploy chamber 116 is in (one-way) fluid communication with return conduit 58, such that the deploy fluid pressure is substantially equal to the tank pressure and such that the retract fluid pressure is substantially equal to the system pressure. Thus, such a configuration may be described as a configuration in which extension element 130 is transitioning toward the retracted state, and/or toward the overstowed position of the retracted state, such as the configuration schematically illustrated in FIG. 6. Accordingly, in some examples, the system pressure associated with supply conduit 56 is greater than the threshold unlock pressure and/or the threshold deploy pressure. Similarly, in some examples, the tank pressure associated with return conduit 58 is less than the threshold unlock pressure and/or the threshold deploy pressure.

Alternatively, if directional control valve 64 were transitioned to the left-hand position schematically illustrated in FIG. 9, supply conduit 56 would be fluidly coupled to each of deploy chamber 116 and retract chamber 120, such that each of the deploy fluid pressure and the retract fluid pressure is substantially equal to the system pressure. As described herein, such a configuration may be described as a configuration in which extension element 130 is transitioning toward the extended state, such as the configuration schematically illustrated in FIG. 7. These and other functional aspects of hydraulic control assembly 52, such as the utility of isolation valve 62, will be appreciated by a person of ordinary skill in the art of hydraulic actuator control systems.

Figure 10:
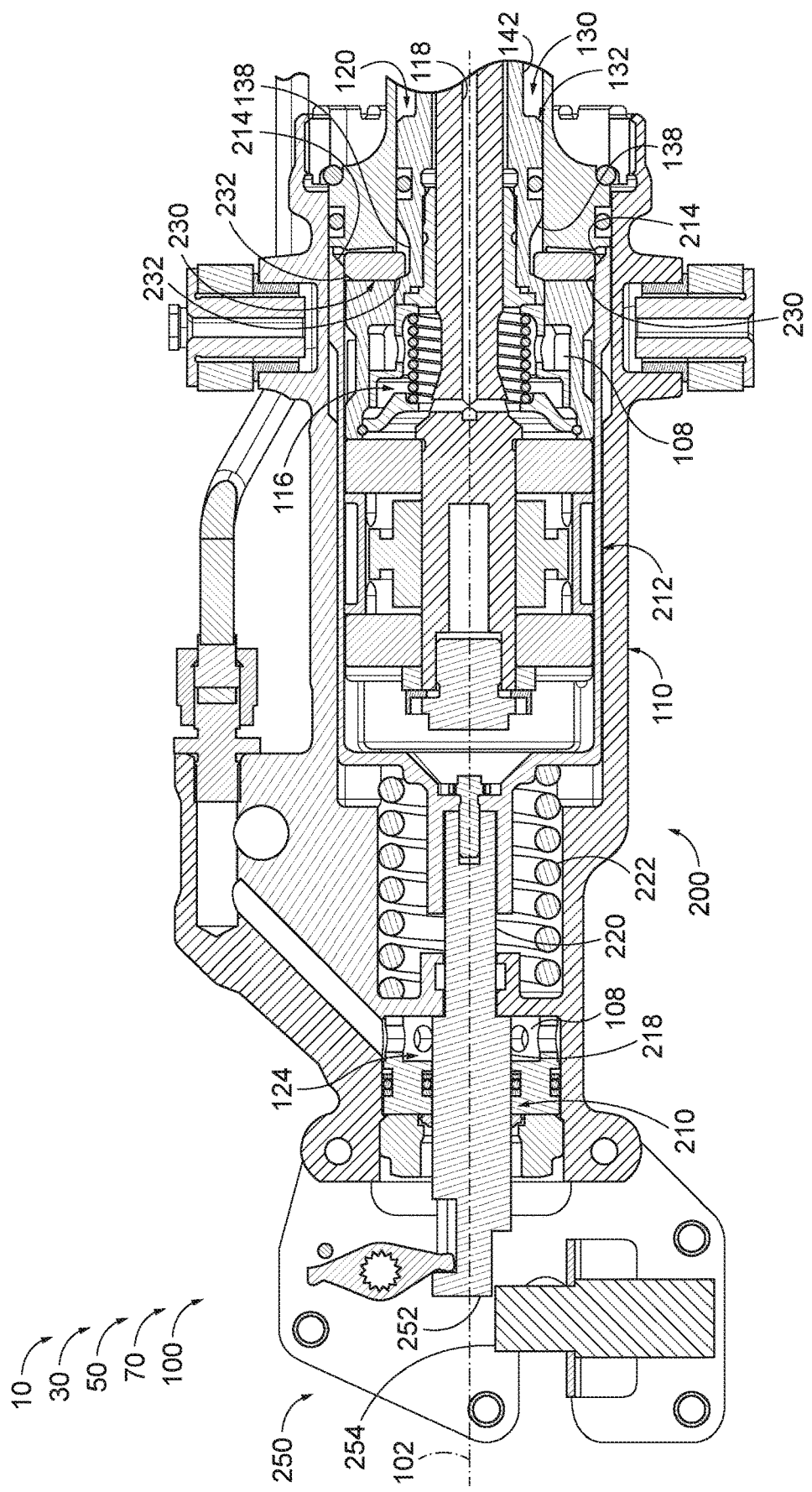
FIG. 10 is a fragmentary cross-sectional side view of a portion of an example of a locking actuator with an extension element in an overstowed position of the retracted state and with a lock assembly in the locked state according to the present disclosure.

FIG. 10 is a less schematic cross-sectional illustration of a portion of an example of locking actuator 100. Specifically, FIG. 10 illustrates a portion of an example of locking actuator 100 in which extension element 130 is in the loading position of the retracted state and which lock assembly 200 is in the locked state. FIG. 10 additionally illustrates an example in which lock assembly 200 includes the plurality of lock bars 230 and in which each lock bar 230 is received within a corresponding lock bar receiver 138 of extension element 130. FIG. 10 further illustrates an example in which lock indicator target 252 does not move directly toward and away from lock indicator sensor 254 as lock assembly 200 transitions between the locked state and the unlocked state, but rather slides past lock indicator sensor 254 during such a transition. In this manner, lock status indicator 250 of the example of FIG. 10 may be described as exhibiting a "slide-by" configuration.

Figure 11:
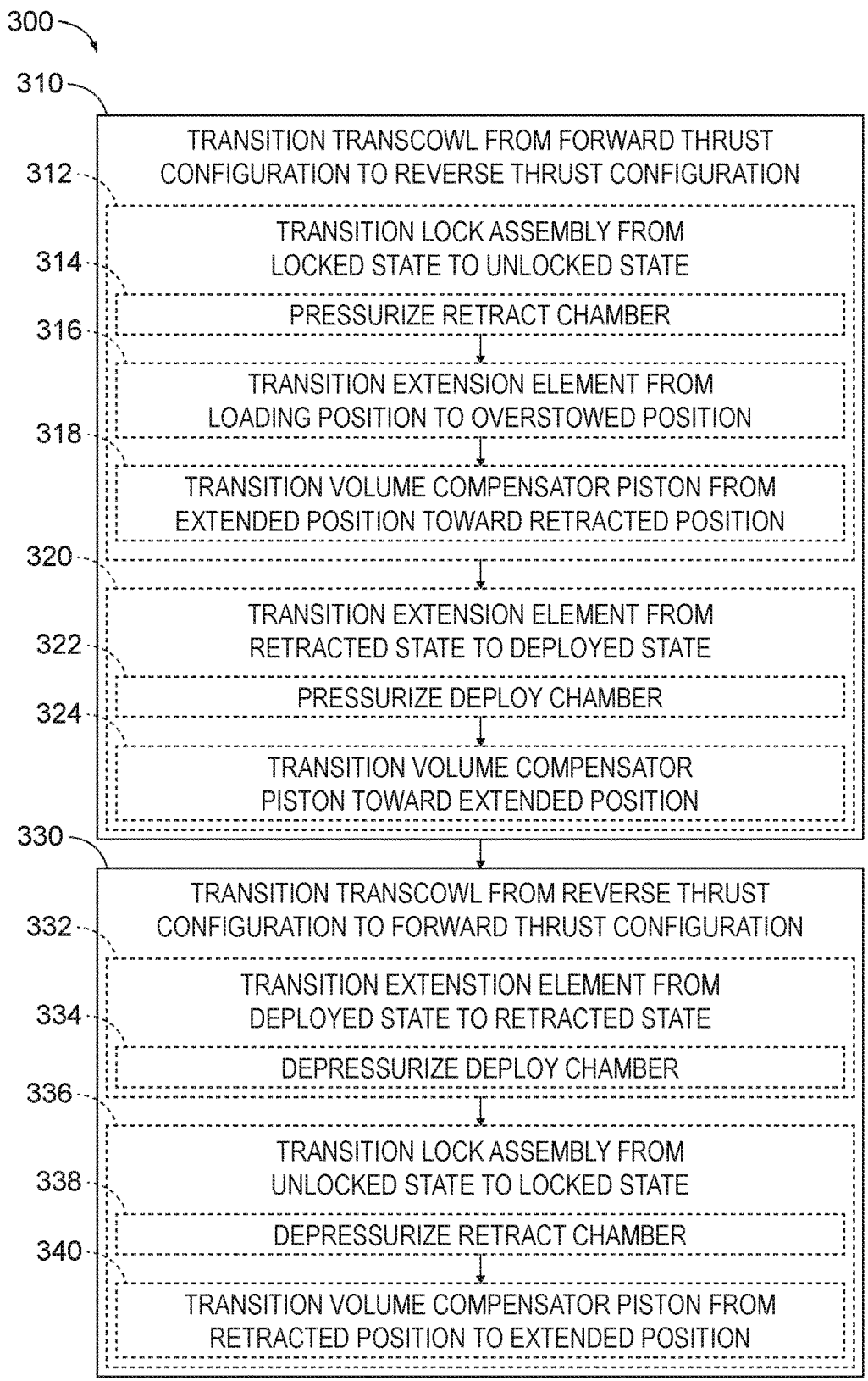
FIG. 11 is a flowchart depicting examples of methods of operating a thrust reverser actuation system according to the present disclosure.

FIG. 11 is a flowchart depicting examples of methods 300, according to the present disclosure, of operating a thrust reverser actuation system (such as thrust reverser actuation system 50) to transition an engine (such as engine 30) between a forward thrust configuration and a reverse thrust configuration (such as the forward thrust configuration and the reverse thrust configuration of engine 30 and/or of transcowl 46). That is, and as shown in FIG. 11, method 300 broadly includes selectively transitioning, at 310, a transcowl (such as transcowl 46 of engine 30) from the forward thrust configuration to the reverse thrust configuration, and/or selectively transitioning, at 330, the transcowl from the reverse thrust configuration to the forward thrust configuration. Specifically, the transitioning the transcowl from the forward thrust configuration to the reverse thrust configuration at 310 and the transitioning the transcowl from the reverse thrust configuration to the forward thrust configuration at 330 are performed with a locking actuator (such as locking actuator 100) as disclosed herein.

In some examples, and as shown in FIG. 11, the transitioning the transcowl from the forward thrust configuration to the reverse thrust configuration at 310 includes transitioning, at 312, a lock assembly (such as lock assembly 200) from a locked state to an unlocked state (such as the locked state and the unlocked state of lock assembly 200), and transitioning, at 320, an extension element (such as extension element 130) from a retracted state to an extended state (such as the retracted state and the extended state of extension element 130). Specifically, in such examples, the transitioning the extension element from the retracted state to the extended state at 320 is performed subsequent to, and independent of, the transitioning the lock assembly from the locked state to the unlocked state at 312. As a more specific example, and as described herein, the transitioning the extension element from the retracted state to the extended state at 320 may be performed strictly subsequent to the transitioning the lock assembly from the locked state to the unlocked state at 312, such as subsequent to completion of the transitioning the lock assembly from the locked state to the unlocked state at 312. In this manner, and as described herein, locking actuators 100 and/or methods 300 according to the present disclosure may enable initiation of the transitioning the extension element from the retracted state to the extended state at 320 subsequent to ensuring that the lock assembly is in an unlocked state.

The transitioning the lock assembly from the locked state to the unlocked state at 312 may be performed in any appropriate manner. In some examples, and as shown in FIG. 11, the transitioning the lock assembly from the locked state to the unlocked state at 312 includes pressurizing, at 314, a retract chamber of the locking actuator (such as retract chamber 120) to bring a retract fluid pressure of a hydraulic fluid within the retract chamber (such as the retract fluid pressure of hydraulic fluid 108 within retract chamber 120) to a system pressure (such as the system pressure associated with hydraulic control assembly 52). The pressurizing the retract chamber at 314 may be performed in any appropriate manner, such as by fluidly connecting a supply conduit (such as supply conduit 56 of hydraulic control assembly 52) to the retract chamber with one or more hydraulic valves (such as hydraulic valves 60).

In some examples, and as further shown in FIG. 11, the transitioning the lock assembly from the locked state to the unlocked state at 312 includes transitioning, at 316, the extension element from a loading position to an overstowed position (such as the loading position and/or the overstowed position of extension element 130). In this manner, and as described herein, the transitioning the extension element from the loading position to the overstowed position at 316 may include translating the extension element relative to one or more lock bars (such as lock bars 230) to remove the extension element from loading engagement with the lock bars.

Additionally or alternatively, in some examples and as further shown in FIG. 11, the transitioning the lock assembly from the locked state to the unlocked state includes transitioning, at 318, a volume compensator piston (such as volume compensator piston 242 of volume compensator 240) from an extended position toward a retracted position (such as the extended position and/or the retracted position of volume compensator piston 242). More specifically, in such examples, and as discussed herein, the transitioning the lock assembly from the locked state to the unlocked state at 312 may include removing at least a portion of a lock member shaft (such as lock member shaft 220) from a deploy chamber (such as deploy chamber 116). Accordingly, in such examples, the transitioning the volume compensator piston from the extended position toward the retracted position at 318 may be performed at least partially automatically, and may include translating the volume compensator piston so as to maintain a substantially constant volume within the deploy chamber.

The transitioning the extension element from the retracted state to the extended state at 320 may be performed in any appropriate manner. In some examples, the transitioning the extension element from the retracted state to the extended state at 320 includes pressurizing, at 322, a deploy chamber (such as deploy chamber 116 of locking actuator 100) to bring a deploy fluid pressure of a hydraulic fluid within the deploy chamber (such as the deploy fluid pressure of hydraulic fluid 108 within deploy chamber 116) to the system pressure. The pressurizing the deploy chamber at 322 may be performed in any appropriate manner, such as by fluidly connecting the supply conduit to the deploy chamber with one or more hydraulic valves.

In some examples, and as further shown in FIG. 11, the transitioning the extension element from the retracted state to the extended state at 320 includes transitioning, at 324, the volume compensator piston toward and/or to the extended position. More specifically, in such examples, the pressurizing the deploy chamber at 322 may include increasing a hydraulic force upon the volume compensator piston from the deploy chamber, thereby urging the volume compensator piston to transition toward the extended position.

The transitioning the transcowl from the reverse thrust configuration to the forward thrust configuration at 330 may be performed in any appropriate manner. In some examples, and as shown in FIG. 11, the transitioning the transcowl from the reverse thrust configuration to the forward thrust configuration at 330 includes transitioning, at 332, the extension element from the extended state to the retracted state, and transitioning, at 336, the lock assembly from the unlocked state to the locked state. Specifically, in such examples, the transitioning the lock assembly from the unlocked state to the locked state at 336 is performed subsequent to, and independent of, the transitioning the extension element from the extended state to the retracted state at 332. As a more specific example, and as described herein, the transitioning the lock assembly from the unlocked state to the locked state at 336 may be performed strictly subsequent to the transitioning the extension element from the extended state to the retracted state at 332, such as subsequent to completion of the transitioning the extension element fully to the retracted state (e.g., to the overstowed position of the retracted state).

In some examples, and as shown in FIG. 11, the transitioning the extension element from the extended state to the retracted state at 332 includes, with the retract fluid pressure of the hydraulic fluid within the retract chamber at the system pressure, depressurizing, at 334, the deploy chamber to bring the deploy fluid pressure to a tank pressure (such as the tank pressure associated with hydraulic control assembly 52). As a more specific example, the depressurizing the deploy chamber at 334 may include fluidly connecting the deploy chamber to a return conduit (such as return conduit 58 of hydraulic control assembly 52) with one or more hydraulic valves.

In some examples, and as shown in FIG. 11, the transitioning the lock assembly from the unlocked state to the unlocked state at 336 includes, with the retract fluid pressure at the system pressure and with the deploy fluid pressure at the tank pressure, depressurizing, at 338, the retract chamber to bring the retract fluid pressure of the hydraulic fluid within the unlock chamber to the tank pressure. In such examples, the depressurizing the retract chamber at 338 also may include and/or result in bringing the retract fluid pressure of the hydraulic fluid within an unlock chamber (such as unlock chamber 124) to the tank pressure. The depressurizing the retract chamber at 338 may be performed in any appropriate manner, such as by fluidly connecting the retract chamber to the return conduit with one or more hydraulic valves.

In some examples, and as further shown in FIG. 11, the depressurizing the retract chamber at 338 includes transitioning, at 340, the volume compensator piston from the retracted position to the extended position. More specifically, in some examples, the volume compensator includes a compensator bias spring (such as compensator bias spring 244) that biases the volume compensator piston toward the extended position. Accordingly, in such examples, the transitioning the volume compensator piston from the retracted position to the extended position at 340 may be performed responsive to the bias force of the compensator bias spring. Additionally or alternatively, the transitioning the volume compensator piston from the retracted position to the extended position at 340 may be performed at least partially responsive to the transitioning the lock assembly from the unlocked state to the locked state at 336, such as to maintain a substantially constant volume within the deploy chamber as the lock member shaft is translated into the deploy chamber.

While the present disclosure generally describes locking actuators 100 in the context of thrust reverser actuation systems 50, engines 30, and/or aircraft 10 that include the locking actuators 100, this is not required, and it is additionally within the scope of the present disclosure that locking actuators 100 may be utilized in any appropriate context. As examples, locking actuators 100 may be implemented and/or utilized in any one of a variety of different applications in any industry, without limitation. For example, locking actuators 100 according to the present disclosure may be implemented in any vehicular application or non-vehicular application. As more specific examples, locking actuators 100 may be implemented in any marine, ground, air, and/or space application, and in any vehicular or non-vehicular system, subsystem, assembly, subassembly, structure, building, machine, or application that utilizes an actuator to actuate a movable device.

Illustrative, non-exclusive examples of inventive subject matter according to the present disclosure are described in the following enumerated paragraphs:

A1. A locking actuator (100) for a thrust reverser actuation system (50) of an engine (30) that is configured to be selectively transitioned between a forward thrust configuration and a reverse thrust configuration, the locking actuator (100) comprising:

an actuator housing (110);

an extension element (130) positioned at least partially within the actuator housing (110) and configured to be operatively coupled to a transcowl (46) of the engine (30) to transition the engine (30) between the forward thrust configuration and the reverse thrust configuration; wherein the extension element (130) defines and extends along an actuator axis (102); and wherein the extension element (130) is configured to translate along the actuator axis (102) to selectively transition the extension element (130) between a retracted state that corresponds to the forward thrust configuration and an extended state that corresponds to the reverse thrust configuration; and a lock assembly (200) with a lock member (210); wherein the lock assembly (200) is configured to be selectively transitioned between a locked state, in which the lock member (210) mechanically restricts the extension element (130) from transitioning from the retracted state to the extended state, and an unlocked state, in which the extension element (130) is free to transition from the retracted state to the extended state;

wherein the lock assembly (200) is configured to be selectively transitioned between the locked state and the unlocked state independent of transitioning the extension element (130) between the retracted state and the extended state.

A2. The locking actuator (100) of paragraph A1, wherein the extension element (130) is configured to translate relative to the actuator housing (110) along a deploying direction (104) that is parallel to the actuator axis (102) as the extension element (130) transitions from the retracted state toward the extended state; and wherein the extension element (130) is configured to translate relative to the actuator housing (110) along a retracting direction (106) that is opposite the deploying direction (104) as the extension element (130) transitions from the extended state toward the retracted state.

A3. The locking actuator (100) of any of paragraphs A1-A2, wherein the extension element (130) includes:

an extension element piston (132) positioned within the actuator housing (110); and a rod (142) statically coupled to the extension element piston (132) and extending away from the extension element piston (132);

wherein the rod (142) extends at least partially exterior of the actuator housing (110) and terminates in a coupling terminal (144) positioned exterior of the actuator housing (110) that is configured to be operatively coupled to the transcowl (46).

A4. The locking actuator (100) of any of paragraphs A1-A3, wherein, when the extension element (130) is in the retracted state, the extension element (130) is configured to translate relative to the actuator housing (110) along the actuator axis (102) to transition among a plurality of positions defined between and including an overstowed position, in which the extension element (130) is restricted from translating further in a/the retracting direction (106), and a loading position, in which the extension element (130) is restricted from translating further in a/the deploying direction (104) when the lock assembly (200) is in the locked state.

A5. The locking actuator (100) of paragraph A4, wherein the lock assembly (200) engages the extension element (130) to restrict the extension element (130) from translating further in the deploying direction (104) when the lock assembly (200) is in the locked state.

A6. The locking actuator (100) of any of paragraphs A4-A5, wherein the extension element (130) further includes a rod stop (146) that is statically coupled to the rod (142); wherein the actuator housing (110) includes a housing stop (112); and wherein the rod stop (146) is configured to selectively engage the housing stop (112) to restrict motion of the extension element (130) in the retracting direction (106).

A7. The locking actuator (100) of paragraph A6, wherein the rod stop (146) engages the housing stop (112) to restrict the extension element (130) from translating further in a/the retracting direction (106) when the extension element (130) is in the overstowed position.

A8. The locking actuator (100) of any of paragraphs A6-A7, wherein, when the extension element (130) is in the loading position, the housing stop (112) and the rod stop (146) are spaced apart by an overstow distance (114).

A9. The locking actuator (100) of any of paragraphs A1-A8, wherein the lock member (210) includes a lock sleeve (212) that is configured to translate relative to the actuator housing (110) along a direction at least substantially parallel to the actuator axis (102) as the lock assembly (200) transitions between the locked state and the unlocked state; and wherein, when the lock assembly (200) is in the locked state, the lock sleeve (212) is positioned to restrict translation of the extension element (130) to maintain the extension element (130) in the retracted state.

A10. The locking actuator (100) of paragraph A9, wherein the lock sleeve (212) extends at least partially circumferentially around a/the extension element piston (132) when the lock assembly (200) is in the locked state.

A11. The locking actuator (100) of any of paragraphs A1-A10, wherein the lock member (210) is configured to translate relative to the actuator housing (110) along an unlocking direction (204) as the lock assembly (200) transitions from the locked state toward the unlocked state; and wherein the lock member (210) is configured to translate relative to the actuator housing (110) along a locking direction (202) that is opposite the unlocking direction (204) as the lock assembly (200) transitions from the unlocked state toward the locked state.

A12. The locking actuator (100) of paragraph A11, wherein the locking direction (202) is parallel to a/the deploying direction (104).

A13. The locking actuator (100) of paragraph A11, wherein the locking direction (202) is antiparallel to a/the deploying direction (104).

A14. The locking actuator (100) of any of paragraphs A11-A13, wherein the lock assembly (200) further includes a lock member bias spring (222) that biases the lock member (210) in the locking direction (202).

A15. The locking actuator (100) of any of paragraphs A11-A14, wherein the lock member (210) is configured to translate relative to the actuator housing (110) to transition among a plurality of positions defined between and including a fully locked position, in which the lock sleeve (212) is at its maximum operative position in the locking direction (202), and a fully unlocked position, in which the lock sleeve (212) is at its maximum operative position in the unlocking direction (204).

A16. The locking actuator (100) of paragraph A15, wherein the lock assembly (200) is in the locked state at least when the lock member (210) is in the fully locked position; and wherein the lock assembly (200) is in the unlocked state at least when the lock member (210) is in the fully unlocked position.

A17. The locking actuator (100) of any of paragraphs A15-A16, wherein, when the lock member (210) is in the fully locked position, the lock assembly (200) is configured to transition from the locked state to the unlocked state when the lock member (210) translates relative to the actuator housing (110) along the unlocking direction (204) by at least a lock sleeve overlap distance (216).

A18. The locking actuator (100) of any of paragraphs A3-A17, wherein the lock assembly (200) further includes one or more lock bars (230); wherein a/the extension element piston (132) defines one or more lock bar receivers (138); and wherein the one or more lock bars (230) are configured to transition between an engaged configuration, in which the one or more lock bars (230) are received within the one or more lock bar receivers (138), and a disengaged configuration, in which the one or more lock bars (230) are removed from the one or more lock bar receivers (138).

A19. The locking actuator (100) of paragraph A18, wherein the one or more lock bars (230) are restricted from translating relative to the actuator housing (110) along a direction parallel to the actuator axis (102).

A20. The locking actuator (100) of any of paragraphs A18-A19, when dependent from paragraph A9, wherein, when the lock assembly (200) is in the locked state, the lock sleeve (212) is positioned to restrict the one or more lock bars (230) from transitioning from the engaged configuration to the disengaged configuration; and wherein, when the lock assembly (200) is in the unlocked state, the lock sleeve (212) is positioned to permit the one or more lock bars (230) to transition from the engaged configuration to the disengaged configuration.

A21. The locking actuator (100) of paragraph A20, wherein, when the lock member (210) is in a/the fully locked position, the lock sleeve (212) extends beyond the one or more lock bars (230) in the locking direction (202) by a/the lock sleeve overlap distance (216) such that the one or more lock bars (230) are free to transition from the engaged configuration to the disengaged configuration only when the lock member (210) is translated away from the fully locked position in the unlocking direction (204) by a distance that is at least equal to the lock sleeve overlap distance (216).

A22. The locking actuator (100) of any of paragraphs A18-A21, wherein each lock bar (230) of the one or more lock bars (230) is configured to translate radially away from the actuator axis (102) as the one or more lock bars (230) transitions from the engaged configuration toward the disengaged configuration; and wherein each lock bar (230) of the one or more lock bars (230) is configured to translate radially toward the actuator axis (102) as the one or more lock bars (230) transitions from the disengaged configuration toward the engaged configuration.

A23. The locking actuator (100) of any of paragraphs A18-A22, wherein a/the extension element piston (132) includes one or more receiver engagement surfaces (140)

that partially define a/the one or more lock bar receivers (138) and that are configured to engage the one or more lock bars (230).

A24. The locking actuator (100) of paragraph A23, wherein, when the lock assembly (200) is in the locked state and the extension element (130) is in the retracted state, engagement between the one or more lock bars (230) and the one or more receiver engagement surfaces (140) restricts the extension element (130) from translating relative to the actuator housing (110) in the deploying direction (104).

A25. The locking actuator (100) of any of paragraphs A23-A24, wherein the locking actuator (100) is configured such that, when the lock assembly (200) is in the unlocked state and the one or more lock bars (230) are initially in the engaged configuration, translating the extension element (130) relative to the actuator housing (110) along the deploying direction (104) urges the one or more receiver engagement surfaces (140) into contact with the one or more lock bars (230) such that the one or more receiver engagement surfaces (140) urges the one or more lock bars (230) to transition from the engaged configuration toward the disengaged configuration.

A26. The locking actuator (100) of any of paragraphs A18-A25, when dependent from paragraph A9, wherein the lock sleeve (212) includes one or more sleeve engagement surfaces (214) that are configured to engage the one or more lock bars (230); and wherein the lock assembly (200) is configured such that, when the lock assembly (200) is initially in the unlocked state and when the one or more lock bars (230) are initially in the disengaged configuration, translating the lock member (210) relative to the actuator housing (110) in the locking direction (202) urges the one or more sleeve engagement surfaces (214) into contact with the one or more lock bars (230) such that the one or more sleeve engagement surfaces (214) urge the one or more lock bars (230) to transition from the disengaged configuration toward the engaged configuration.

A27. The locking actuator (100) of any of paragraphs A18-A26, wherein each lock bar (230) of the one or more lock bars (230) includes one or more bar engagement surfaces (232), wherein each bar engagement surface (232) is configured to engage one or both of a/the receiver engagement surface (140) and a/the sleeve engagement surface (214) as the lock bar (230) transitions between the engaged configuration and the disengaged configuration.

A28. The locking actuator (100) of paragraph A27, wherein at least one of the one or more bar engagement surfaces (232) of each lock bar (230) includes, and optionally is, a sloped surface.

A29. The locking actuator (100) of any of paragraphs A1-A28, further comprising a lock status indicator (250) that includes:
a lock indicator target (252); and
a lock indicator sensor (254) configured to sense a proximity between the lock indicator target (252) and the lock indicator sensor (254); wherein the lock status indicator (250) is configured to generate a lock status signal based, at least in part, on a lock target distance (256) separating the lock indicator sensor (254) and the lock indicator target (252).

A30. The locking actuator (100) of paragraph A29, wherein one of the lock indicator target (252) and the lock indicator sensor (254) is at least substantially fixed relative to the actuator housing (110); and wherein the other of the lock indicator target (252) and the lock indicator sensor (254) is fixedly coupled to the lock member (210).

A31. The locking actuator (100) of any of paragraphs A29-A30, wherein the lock status indicator (250) is configured such that:
(i) the lock status signal indicates that the lock assembly (200) is in the locked state when the lock target distance (256) is within a locked target distance range (260); and
(ii) the lock status signal indicates that the lock assembly (200) is in the unlocked state when the lock target distance (256) is within an unlocked target distance range (262).

A32. The locking actuator (100) of paragraph A31, wherein the locked target distance range (260) and the unlocked target distance range (262) are separated by a sensing uncertainty range (264); and wherein, when the lock target distance (256) is within the sensing uncertainty range (264), the lock status signal is at least partially based upon whether the lock target distance (256) was more recently within the locked target distance range (260) or the unlocked target distance range (262).

A33. The locking actuator (100) of paragraph A32, wherein a/the lock sleeve overlap distance (216) is greater than a range of distances encompassed by the sensing uncertainty range (264).

A34. The locking actuator (100) of any of paragraphs A29-A33, wherein the lock indicator target (252) includes one or more of a metal, a nonferrous metal, a ferrous metal, and a ferromagnetic material.

A35. The locking actuator (100) of any of paragraphs A29-A34, wherein the lock indicator sensor (254) includes one or both of an inductive sensor and a magnetic sensor.

A36. The locking actuator (100) of any of paragraphs A1-A35, wherein the actuator housing (110) defines a deploy chamber (116) and a retract chamber (120) that are fluidly isolated from one another; wherein the locking actuator (100) further includes hydraulic fluid (108) occupying each of the deploy chamber (116) and the retract chamber (120); wherein a hydraulic pressure of the hydraulic fluid (108) occupying the deploy chamber (116) is a deploy fluid pressure; wherein a hydraulic pressure of the hydraulic fluid (108) occupying the retract chamber (120) is a retract fluid pressure; and wherein the locking actuator (100) is configured to transition the extension element (130) between the retracted state and the extended state at least partially via selective variation of one or both of the deploy fluid pressure and the retract fluid pressure.

A37. The locking actuator (100) of paragraph A36, wherein the locking actuator (100) is configured such that the lock assembly (200) transitions from the locked state to the unlocked state when the retract fluid pressure is greater than the deploy fluid pressure.

A38. The locking actuator (100) of any of paragraphs A36-A37, wherein the lock assembly (200) is configured to transition from the locked state to the unlocked state when the retract fluid pressure is greater than a threshold unlock pressure.

A39. The locking actuator (100) of any of paragraphs A36-A38, wherein a/the lock sleeve (212) is positioned within the deploy chamber (116), and wherein at least a portion of the lock member (210) extends out of the deploy chamber (116).

A40. The locking actuator (100) of any of paragraphs A36-A39, wherein the actuator housing (110) further defines an unlock chamber (124) that is fluidly connected to the retract chamber (120) such that the hydraulic fluid (108) occupies the unlock chamber (124) with a hydraulic pressure that is at least substantially equal to the retract fluid pressure; wherein the lock member (210) further includes a lock piston (218) extending at least partially within the unlock chamber (124); and wherein, when the retract fluid pressure is greater than the threshold unlock pressure, the hydraulic fluid (108) within the unlock chamber (124) urges the lock piston (218) to translate in the unlocking direction (204), thereby to transition the lock assembly (200) toward the unlocked state.

A41. The locking actuator (100) of paragraph A40, wherein the lock member (210) further includes a lock member shaft (220) that extends between the lock sleeve (212) and the lock piston (218) to fixedly couple lock sleeve (212) and the lock piston (218) to one another.

A42. The locking actuator (100) of any of paragraphs A36-A41, further comprising a volume compensator (240) that includes a volume compensator piston (242) that is exposed to each of the deploy chamber (116) and the unlock chamber (124); wherein the volume compensator piston (242) is configured to translate relative to the actuator housing (110) to transition among a plurality of positions defined between and including an extended position and a retracted position; and wherein the volume compensator (240) further includes a compensator bias spring (244) that biases the volume compensator piston (242) toward the extended position.

A43. The locking actuator (100) of paragraph A42, wherein the volume compensator piston (242) is configured to transition from the extended position toward the retracted position when the retract fluid pressure is greater than a/the threshold unlock pressure.

A44. The locking actuator (100) of any of paragraphs A42-A43, wherein the volume compensator piston (242) is configured to transition between the extended position and the retracted position to maintain an at least substantially constant volume within the deploy chamber (116) as the lock assembly (200) transitions between the locked state and the unlocked state.

A45. The locking actuator (100) of any of paragraphs A36-A44, when dependent from paragraph A3, wherein the extension element piston (132) at least partially fluidly isolates the deploy chamber (116) and the retract chamber (120) from one another.

A46. The locking actuator (100) of any of paragraphs A36-A45, wherein the extension element (130) is configured to translate in a/the deploying direction (104) when both of:
(i) the deploy fluid pressure is greater than a threshold deploy pressure; and
(ii) a ratio of the deploy fluid pressure to the retract fluid pressure is greater than a threshold pressure ratio.

A47. The locking actuator (100) of paragraph A46, wherein the extension element (130) is configured to translate in a/the retracting direction (106) when the ratio of the deploy fluid pressure to the retract fluid pressure is less than the threshold pressure ratio.

A48. The locking actuator (100) of any of paragraphs A46-A47, wherein the threshold pressure ratio is at most 1:1.

A49. The locking actuator (100) of any of paragraphs A36-A48, wherein the extension element piston (132) has a deploy piston head (134) that faces the deploy chamber (116) and a retract piston head (136) that faces the retract chamber (120); wherein the deploy piston head (134) has a deploy piston head area, as measured perpendicular to the actuator axis (102); wherein the retract piston head (136) has a retract piston head area, as measured perpendicular to the actuator axis (102); and wherein the deploy piston head area is greater than the retract piston head area.

A50. The locking actuator (100) of any of paragraphs A36-A49, wherein the actuator housing (110) includes a deploy port (118) that permits fluid access to the deploy chamber (116) and a retract port (122) that permits fluid access to the retract chamber (120).

B1. A thrust reverser actuation system (50) configured to selectively translate a transcowl (46) of an engine (30) to selectively transition the engine (30) between a forward thrust configuration and a reverse thrust configuration; the thrust reverser actuation system (50) comprising:
an actuator assembly (70) operatively coupled to the transcowl (46) and configured to translate the transcowl (46) along a direction parallel to an actuator axis (102); and
a hydraulic control assembly (52) configured to regulate a flow of hydraulic fluid (108) to the actuator assembly (70) via one or more hydraulic conduits (54) to selectively transition the engine (30) between the forward thrust configuration and the reverse thrust configuration;
wherein the actuator assembly (70) includes the locking actuator (100) of any of paragraphs A1-A50.

B2. The thrust reverser actuation system (50) of paragraph B1, wherein the one or more hydraulic conduits (54) includes:
(i) a supply conduit (56) that conveys hydraulic fluid (108) at a system pressure; and
(ii) a return conduit (58) that coveys hydraulic fluid (108) at a tank pressure that is less than the system pressure; and
wherein the hydraulic control assembly (52) includes one or more hydraulic valves (60) configured to selectively fluidly couple each of the supply conduit (56) and the return conduit (58) to one or both of a/the deploy chamber (116) and a/the retract chamber (120).

B3. The thrust reverser actuation system (50) of paragraph B2, wherein the one or more hydraulic valves (60) includes one or both of:
(i) an isolation valve (62) that is configured to selectively isolate the supply conduit (56) from the locking actuator (100); and
(ii) a directional control valve (64) that is configured to selectively fluidly couple the deploy chamber (116) and the retract chamber (120) to one another.

B4. The thrust reverser actuation system (50) of any of paragraphs B2-B3, wherein the system pressure is greater than one or both of a/the threshold unlock pressure and a/the threshold deploy pressure.

B5. The thrust reverser actuation system (50) of any of paragraphs B2-B4, wherein the tank pressure is less than one or both of a/the threshold unlock pressure and a/the threshold deploy pressure.

B6. The thrust reverser actuation system (50) of any of paragraphs B1-B5, wherein the actuator assembly (70) includes a plurality of transcowl actuators (72) that includes the locking actuator (100) in addition to one or more of:
(i) one or more additional locking actuators (100) of any of paragraphs A1-A50; and
(ii) one or more non-locking actuators (74).

B7. The thrust reverser actuation system (50) of paragraph B6, wherein the actuator assembly (70) further includes one or more synchronization tubes (76) operatively coupled to the plurality of transcowl actuators (72) to synchronize the operation of the plurality of transcowl actuators (72).

C1. An engine (30), comprising:
(i) a thrust generator (44) configured to receive an incoming airstream (32);
(ii) a nacelle (42) at least substantially enclosing the thrust generator (44);
(iii) a transcowl (46) operatively coupled to the nacelle (42); and (iv) the thrust reverser actuation system (50) of any of paragraphs B1-B7;
wherein the thrust reverser actuation system (50) is configured to selectively translate the transcowl (46) relative to the nacelle (42) to selectively transition the engine (30) between the forward thrust configuration, in which the thrust generator (44) generates a forward thrust airstream (34) in a forward thrust direction (36), and the reverse thrust configuration, in which the thrust generator (44) generates a reverse thrust airstream (38) at least partially in a reverse thrust direction (40) that is substantially opposite the forward thrust direction (36).

C2. The engine (30) of paragraph C1, wherein the engine (30) is a turbofan engine (30).

D1. An aircraft (10) comprising the engine (30) of any of paragraphs C1-C2.

D2. The aircraft (10) of paragraph D1, further comprising an aircraft hydraulic system (20) configured to supply the hydraulic fluid (108) to the hydraulic control assembly (52).

D3. The aircraft (10) of any of paragraphs D1-D2, further comprising one or more of:
(i) a fuselage (12);
(ii) one or more wings (14);
(iii) a horizontal stabilizer (16); and
(iv) a vertical stabilizer (18).

E1. A method (300) of operating the thrust reverser actuation system (50) of any of paragraphs B1-B7, the method comprising one or both of:
(i) selectively transitioning (310) the transcowl (46) from the forward thrust configuration to the reverse thrust configuration; and
(ii) selectively transitioning (330) the transcowl (46) from the reverse thrust configuration to the forward thrust configuration.

E2. The method (300) of paragraph E1, wherein the transitioning (310) the transcowl (46) from the forward thrust configuration to the reverse thrust configuration includes:
transitioning (312) the lock assembly (200) from the locked state to the unlocked state; and
transitioning (320) the extension element (130) from the retracted state to the extended state;
wherein the transitioning (320) the extension element (130) from the retracted state to the extended state is performed subsequent to, and independent of, the transitioning (312) the lock assembly (200) from the locked state to the unlocked state.

E3. The method (300) of paragraph E2, wherein the transitioning (312) the lock assembly (200) from the locked state to the unlocked state includes pressurizing (314) a/the retract chamber (120) of the locking actuator (100) to bring a/the retract fluid pressure of a/the hydraulic fluid (108) within the retract chamber (120) to a/the system pressure.

E4. The method (300) of paragraph E3, wherein the pressurizing (314) the retract chamber (120) includes fluidly connecting a/the supply conduit (56) to the retract chamber (120) with a/the one or more hydraulic valves (60).

E5. The method (300) of any of paragraphs E2-E4, wherein the transitioning (312) the lock assembly (200) from the locked state to the unlocked state includes transitioning (316) the extension element (130) from a/the loading position to an/the overstowed position.

E6. The method (300) of any of paragraphs E2-E5, wherein the transitioning (312) the lock assembly (200) from the locked state to the unlocked state includes transitioning (318) a/the volume compensator piston (242) from a/the extended position toward a/the retracted position.

E7. The method (300) of any of paragraphs E2-E6, wherein the transitioning (320) the extension element (130) from the retracted state to the extended state includes pressurizing (322) a/the deploy chamber (116) of the locking actuator (100) to bring a/the deploy fluid pressure of a/the hydraulic fluid (108) within the deploy chamber (116) to a/the system pressure.

E8. The method (300) of paragraph E7, wherein the pressurizing (322) the deploy chamber (116) includes fluidly connecting a/the supply conduit (56) to the deploy chamber (116) with a/the one or more hydraulic valves (60).

E9. The method (300) of any of paragraphs E2-E8, wherein the transitioning (320) the extension element (130) from the retracted state to the extended state includes transitioning (324) a/the volume compensator piston (242) toward, and optionally to, the extended position.

E10. The method (300) of any of paragraphs E1-E9, wherein the transitioning (330) the transcowl (46) from the reverse thrust configuration to the forward thrust configuration includes: transitioning (332) the extension element (130) from the extended state to the retracted state; and
transitioning (336) the lock assembly (200) from the unlocked state to the locked state;
wherein the transitioning (336) the lock assembly (200) from the unlocked state to the locked state is performed subsequent to, and independent of, the transitioning (332) the extension element (130) from the extended state to the retracted state.

E11. The method (300) of paragraph E10, wherein the transitioning (332) the extension element (130) from the extended state to the retracted state includes, with a/the retract fluid pressure of a/the hydraulic fluid (108) within a/the retract chamber (120) at a/the system pressure, depressurizing (334) a/the deploy chamber (116) to bring a/the deploy fluid pressure of the hydraulic fluid (108) within the deploy chamber (116) to a/the tank pressure.

E12. The method (300) of paragraph E11, wherein the depressurizing (334) the deploy chamber (116) includes fluidly connecting the deploy chamber (116) to a/the return conduit (58) with a/the one or more hydraulic valves (60).

E13. The method (300) of any of paragraphs E10-E12, wherein the transitioning (336) the lock assembly (200) from the unlocked state to the locked state includes, with a/the retract fluid pressure of a/the hydraulic fluid (108) within a/the retract chamber (120) at a/the system pressure and with a/the deploy fluid pressure of a/the hydraulic fluid (108) within a/the deploy chamber (116) at a/the tank pressure, depressurizing (338) a/the retract chamber (120) to bring a/the retract fluid pressure of the hydraulic fluid (108) within a/the retract chamber (120) to the tank pressure.

E14. The method (300) of paragraph E13, wherein the depressurizing (338) the retract chamber (120) includes bringing the retract fluid pressure of the hydraulic fluid (108) within a/the unlock chamber (124) to the tank pressure.

E15. The method (300) of any of paragraphs E13-E14, wherein the depressurizing (338) the retract chamber (120) includes fluidly connecting the retract chamber (120) to a/the return conduit (58) with a/the one or more hydraulic valves (60).

E16. The method (300) of any of paragraphs E13-E15, wherein the depressurizing (338) the retract chamber (120) includes transitioning (340) a/the volume compensator piston (242) from a/the retracted position to a/the extended position.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A locking actuator for a thrust reverser actuation system of an engine that is configured to be selectively transitioned between a forward thrust configuration and a reverse thrust configuration, the locking actuator comprising:
    an actuator housing;
    an extension element positioned at least partially within the actuator housing and configured to be operatively coupled to a transcowl of the engine to transition the engine between the forward thrust configuration and the reverse thrust configuration; wherein the extension element defines and extends along an actuator axis; and wherein the extension element is configured to translate along the actuator axis to selectively transition the extension element between a retracted state that corresponds to the forward thrust configuration and an extended state that corresponds to the reverse thrust configuration, wherein the extension element translates in a deploying direction from the retracted state to the extended state; and
    a lock assembly with a lock member; wherein the lock assembly is configured to be selectively transitioned between a locked state, in which the lock member mechanically restricts the extension element from transitioning from the retracted state to the extended state, and an unlocked state, in which the extension element is free to transition from the retracted state to the extended state;
    wherein the lock member includes a lock sleeve that is configured to translate relative to the actuator housing in an unlocking direction as the lock assembly transitions from the locked state to the unlocked state, wherein the unlocking direction is at least substantially opposite to the deploying direction, wherein when the lock assembly is in the locked state, the lock sleeve is positioned to restrict translation of the extension element to maintain the extension element in the retracted state, wherein the lock sleeve at least partially surrounds the extension element in the retracted state; and
    wherein the lock assembly is configured to be selectively transitioned between the locked state and the unlocked state independent of transitioning the extension element between the retracted state and the extended state.

2. The locking actuator of claim 1, wherein the unlocking direction is at least substantially parallel to the actuator axis.

3. The locking actuator of claim 1, wherein the lock member is configured to translate relative to the actuator housing along a locking direction that is opposite the unlocking direction as the lock assembly transitions from the unlocked state toward the locked state; wherein the lock member is configured to translate relative to the actuator housing to transition among a plurality of positions defined between and including a fully locked position, in which the lock sleeve is at its maximum operative position in the locking direction, and a fully unlocked position, in which the lock sleeve is at its maximum operative position in the unlocking direction; and wherein, when the lock member is in the fully locked position, the lock assembly is configured to transition from the locked state to the unlocked state when the lock member translates relative to the actuator housing along the unlocking direction by at least a lock sleeve overlap distance.

4. The locking actuator of claim 3, wherein the lock assembly further includes one or more lock bars; wherein the extension element defines one or more lock bar receivers; and wherein the one or more lock bars are configured to transition between an engaged configuration, in which the one or more lock bars are received within the one or more lock bar receivers, and a disengaged configuration, in which the one or more lock bars are removed from the one or more lock bar receivers; and wherein, when the lock member is in the fully locked position, the lock sleeve extends beyond the one or more lock bars in the locking direction by the lock sleeve overlap distance such that the one or more lock bars are free to transition from the engaged configuration to the disengaged configuration only when the lock member is translated away from the fully locked position in the unlocking direction by a distance that is at least equal to the lock sleeve overlap distance.

5. The locking actuator of claim 3, further comprising a lock status indicator that includes:
    a lock indicator target; and
    a lock indicator sensor configured to sense a proximity between the lock indicator target and the lock indicator sensor;
    wherein the lock status indicator is configured to generate a lock status signal based, at least in part, on a lock target distance separating the lock indicator sensor and the lock indicator target;
    wherein the lock status indicator is configured such that:
    (i) the lock status signal indicates that the lock assembly is in the locked state when the lock target distance is within a locked target distance range; and
    (ii) the lock status signal indicates that the lock assembly is in the unlocked state when the lock target distance is within an unlocked target distance range;
    wherein the locked target distance range and the unlocked target distance range are separated by a sensing uncertainty range; wherein, when the lock target distance is within the sensing uncertainty range, the lock status signal is at least partially based upon whether the lock target distance was more recently within the locked target distance range or the unlocked target distance range; and wherein the lock sleeve overlap distance is greater than a range of distances encompassed by the sensing uncertainty range.

6. The locking actuator of claim 1, further comprising a lock status indicator that includes:
a lock indicator target; and
a lock indicator sensor configured to sense a proximity between the lock indicator target and the lock indicator sensor;
wherein one of the lock indicator target and the lock indicator sensor is at least substantially fixed relative to the actuator housing; wherein the other of the lock indicator target and the lock indicator sensor is fixedly coupled to the lock member.

7. The locking actuator of claim 1, wherein the actuator housing defines a deploy chamber and a retract chamber that are fluidly isolated from one another; wherein the locking actuator further includes hydraulic fluid occupying each of the deploy chamber and the retract chamber; wherein a hydraulic pressure of the hydraulic fluid occupying the deploy chamber is a deploy fluid pressure; wherein a hydraulic pressure of the hydraulic fluid occupying the retract chamber is a retract fluid pressure; and wherein the locking actuator is configured to transition the extension element between the retracted state and the extended state at least partially via selective variation of one or both of the deploy fluid pressure and the retract fluid pressure; and wherein the locking actuator is configured such that the lock assembly transitions from the locked state to the unlocked state when the retract fluid pressure is both:
(i) greater than the deploy fluid pressure; and
(ii) greater than a threshold unlock pressure.

8. The locking actuator of claim 7, wherein the actuator housing further defines an unlock chamber that is fluidly connected to the retract chamber such that the hydraulic fluid occupies the unlock chamber with a hydraulic pressure that is at least substantially equal to the retract fluid pressure; wherein the lock member further includes a lock piston extending at least partially within the unlock chamber; and wherein, when the retract fluid pressure is greater than the threshold unlock pressure, the hydraulic fluid within the unlock chamber urges the lock piston to translate in the unlocking direction, thereby to transition the lock assembly toward the unlocked state.

9. The locking actuator of claim 8, further comprising a volume compensator that includes a volume compensator piston that is exposed to each of the deploy chamber and the unlock chamber; wherein the volume compensator piston is configured to translate relative to the actuator housing to transition among a plurality of positions defined between and including an extended position and a retracted position; wherein the volume compensator further includes a compensator bias spring that biases the volume compensator piston toward the extended position; and wherein the volume compensator piston is configured to transition between the extended position and the retracted position to maintain an at least substantially constant volume within the deploy chamber as the lock assembly transitions between the locked state and the unlocked state.

10. The locking actuator of claim 7, wherein the extension element is configured to translate relative to the actuator housing along the deploying direction, which is parallel to the actuator axis, as the extension element transitions from the retracted state toward the extended state; wherein the extension element is configured to translate relative to the actuator housing along a retracting direction that is opposite the deploying direction as the extension element transitions from the extended state toward the retracted state; wherein the extension element is configured to translate in the deploying direction when both of:
(i) the deploy fluid pressure is greater than a threshold deploy pressure; and
(ii) a ratio of the deploy fluid pressure to the retract fluid pressure is greater than a threshold pressure ratio; and
wherein the extension element is configured to translate in the retracting direction when the ratio of the deploy fluid pressure to the retract fluid pressure is less than the threshold pressure ratio.

11. A thrust reverser actuation system configured to selectively translate a transcowl of an engine between a forward thrust configuration and a reverse thrust configuration; the thrust reverser actuation system comprising:
an actuator assembly operatively coupled to the transcowl and configured to translate the transcowl along a direction parallel to an actuator axis; and
a hydraulic control assembly configured to regulate a flow of hydraulic fluid to the actuator assembly via one or more hydraulic conduits to selectively transition the transcowl between the forward thrust configuration and the reverse thrust configuration;
wherein the actuator assembly includes the locking actuator of claim 1.

12. The thrust reverser actuation system of claim 11, wherein the one or more hydraulic conduits includes:
a supply conduit that conveys hydraulic fluid at a system pressure; and
a return conduit that conveys hydraulic fluid at a tank pressure that is less than the system pressure; and
wherein the hydraulic control assembly includes one or more hydraulic valves configured to selectively fluidly couple each of the supply conduit and the return conduit to one or both of a deploy chamber of the locking actuator and a retract chamber of the locking actuator;
wherein the system pressure is greater than one or both of a threshold unlock pressure for transitioning the lock assembly from the locked state to the unlocked state and a threshold deploy pressure for transitioning the extension element from the retracted state to the extended state; and
wherein the tank pressure is less than one or both of the threshold unlock pressure and the threshold deploy pressure.

13. An engine, comprising:
a thrust generator configured to receive an incoming airstream;
a nacelle at least substantially enclosing the thrust generator;
a transcowl operatively coupled to the nacelle; and
the thrust reverser actuation system of claim 11;
wherein the thrust reverser actuation system is configured to selectively translate the transcowl relative to the nacelle to selectively transition the engine between the forward thrust configuration, in which the thrust generator generates a thrust airstream in a forward thrust direction, and the reverse thrust configuration, in which the thrust generator generates a reverse thrust airstream at least partially in a reverse thrust direction that is opposite the forward thrust direction.

14. An aircraft comprising the engine of claim 13.

15. A method of operating the thrust reverser actuation system of claim 11, the method comprising:
selectively transitioning the transcowl from the forward thrust configuration to the reverse thrust configuration;

wherein the transitioning the transcowl from the forward thrust configuration to the reverse thrust configuration includes:

transitioning the lock assembly from the locked state to the unlocked state; and transitioning the extension element from the retracted state to the extended state;

wherein the transitioning the extension element from the retracted state to the extended state is performed subsequent to, and independent of, the transitioning the lock assembly from the locked state to the unlocked state.

16. The method of claim 15, wherein the locking actuator includes a retract chamber containing a volume of hydraulic fluid at a retract fluid pressure, and wherein the transitioning the lock assembly from the locked state to the unlocked state includes pressurizing the retract chamber to bring the retract fluid pressure to a system pressure that is greater than a threshold unlock pressure for transitioning the lock assembly from the locked state to the unlocked state.

17. The method of claim 15, wherein the locking actuator includes a deploy chamber containing a volume of hydraulic fluid at a deploy fluid pressure, and wherein the transitioning the extension element from the retracted state to the extended state includes pressurizing the deploy chamber to bring the deploy fluid pressure to a system pressure that is greater than a threshold deploy pressure for transitioning the extension element from the retracted state to the extended state.

18. The method of claim 15, further comprising:

selectively transitioning the transcowl from the reverse thrust configuration to the forward thrust configuration;

wherein the transitioning the transcowl from the reverse thrust configuration to the forward thrust configuration includes:

transitioning the extension element from the extended state to the retracted state; and transitioning the lock assembly from the unlocked state to the locked state;

wherein the transitioning the lock assembly from the unlocked state to the locked state is performed subsequent to, and independent of, the transitioning the extension element from the extended state to the retracted state.

19. The method of claim 18, wherein the locking actuator includes a deploy chamber containing a volume of hydraulic fluid at a deploy fluid pressure and a retract chamber containing a volume of hydraulic fluid at a retract fluid pressure; and wherein the transitioning the extension element from the extended state to the retracted state includes, with the retract fluid pressure at a system pressure, depressurizing the deploy chamber to bring the deploy fluid pressure to a tank pressure that is less than the system pressure.

20. The method of claim 18, wherein the locking actuator includes a deploy chamber containing a volume of hydraulic fluid at a deploy fluid pressure and a retract chamber containing a volume of hydraulic fluid at a retract fluid pressure; and wherein the transitioning the lock assembly from the unlocked state to the locked state includes, with the retract fluid pressure at a system pressure and with the deploy fluid pressure at a tank pressure that is less than the system pressure, depressurizing the retract chamber to bring the retract fluid pressure to the tank pressure.

* * * * *